United States Patent
Kayano et al.

(10) Patent No.: US 11,450,465 B2
(45) Date of Patent: Sep. 20, 2022

(54) MAGNETIC FIELD APPLICATION DEVICE

(71) Applicant: DAIKIN INDUSTRIES, LTD., Osaka (JP)

(72) Inventors: Akane Kayano, Osaka (JP); Yoshinari Asano, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/185,375

(22) Filed: Feb. 25, 2021

(65) Prior Publication Data

US 2021/0183556 A1  Jun. 17, 2021

Related U.S. Application Data

(63) Continuation of application No. PCT/JP2019/035352, filed on Sep. 9, 2019.

(30) Foreign Application Priority Data

Sep. 14, 2018 (JP) .............................. JP2018-172023

(51) Int. Cl.
*H01F 7/00* (2006.01)
*H01F 7/06* (2006.01)
(Continued)

(52) U.S. Cl.
CPC .............. *H01F 7/064* (2013.01); *H01F 7/20* (2013.01); *F25B 21/04* (2013.01)

(58) Field of Classification Search
None
See application file for complete search history.

(56) References Cited

U.S. PATENT DOCUMENTS

2010/0212327 A1  8/2010  Barve et al.
2017/0207690 A1*  7/2017  Paweletz ................ H02K 33/16

FOREIGN PATENT DOCUMENTS

JP  2004-317040 A  11/2004
JP  2012-177499 A  9/2012

OTHER PUBLICATIONS

International Search Report of corresponding PCT Application No. PCT/JP2019/035352 dated Nov. 19, 2019.
(Continued)

*Primary Examiner* — Stephen W Jackson
(74) *Attorney, Agent, or Firm* — Global IP Counselors, LLP

(57) ABSTRACT

A magnetic field application device includes a magnetic field application unit provided with a magnetic working substance, a permanent magnet, a yoke and a coil. The magnetic field application unit applies a magnetic field to the magnetic working substance. The yoke forms at least two closed magnetic circuits, each being a closed circuit that magnetically connects both ends in a magnetization direction of the permanent magnet. The coil is capable of changing an intensity of the magnetic field applied to the magnetic working substance. The coil is provided in at least one of the closed magnetic circuits. The magnetic field application unit is disposed in at least one of the closed magnetic circuits. A magnetic flux of the permanent magnet is branched to flow through two or more of the closed magnetic circuits including the closed magnetic circuit provided with the magnetic field application unit when the coil is non-energized.

31 Claims, 27 Drawing Sheets

(51) Int. Cl.
*H01F 7/20* (2006.01)
*F25B 21/04* (2006.01)

(56) References Cited

OTHER PUBLICATIONS

European Search Report of corresponding EP Application No. 19 85 8930.1 dated Feb. 25, 2022.
International Preliminary Report of corresponding PCT Application No. PCT/JP2019/035352 dated Mar. 25, 2021.

* cited by examiner

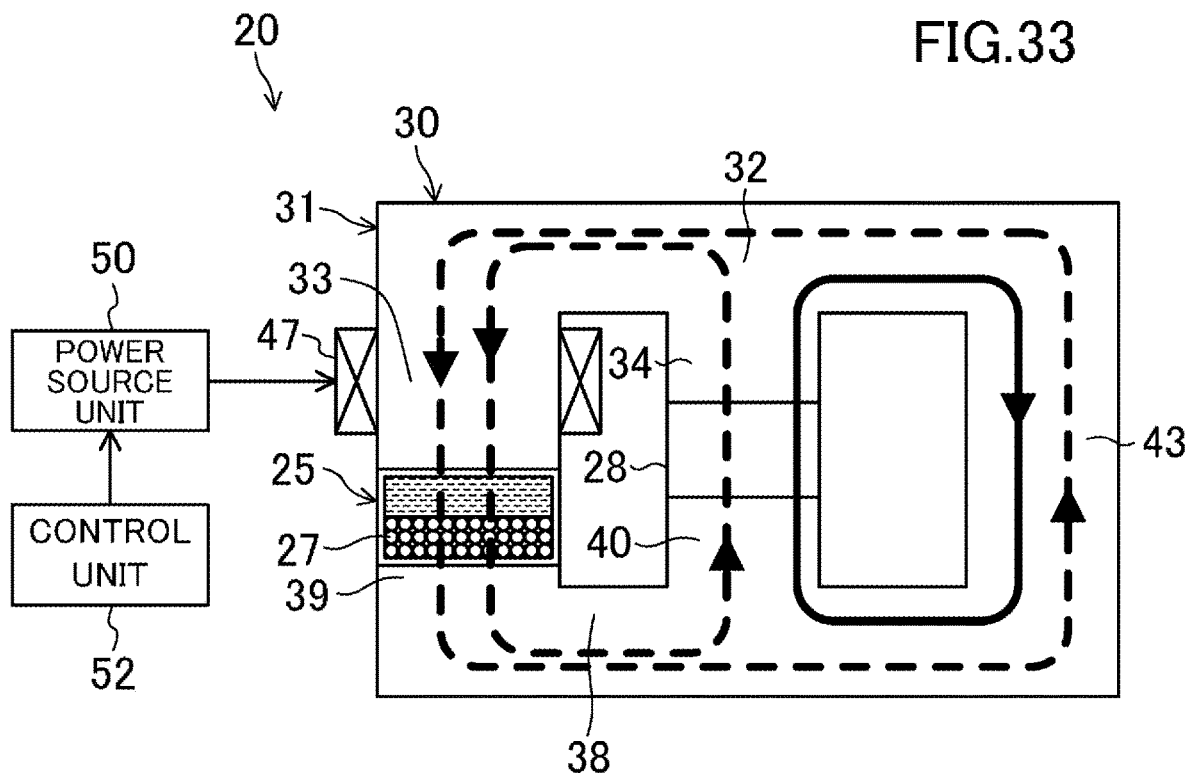

MAGNETIC FIELD APPLICATION DEVICE

CROSS-REFERENCE TO RELATED APPLICATIONS

This is a continuation of International Application No. PCT/JP2019/035352 filed on Sep. 9, 2019, which claims priority to Japanese Patent Application No. 2018-172023, filed on Sep. 14, 2018. The entire disclosures of these applications are incorporated by reference herein.

BACKGROUND

Field of Invention

The present disclosure relates to a magnetic field application device.

Background Information

A magnetic field application device for applying and removing a magnetic field to and from a magnetic working substance has been known (see, e.g., Japanese Unexamined Patent Publication No. 2004-317040). The magnetic field application device according to Japanese Unexamined Patent Publication No. 2004-317040 is configured to apply a magnetic field to the magnetic working substance when a current flows through a coil, and apply no magnetic field to the magnetic working substance when the coil is non-energized.

SUMMARY

An aspect of the present disclosure is directed to a magnetic field application device includes a magnetic field application unit provided with a magnetic working substance, a permanent magnet, a yoke and a coil. The magnetic field application unit applies a magnetic field to the magnetic working substance. The yoke forms at least two closed magnetic circuits, each being a closed circuit that magnetically connects both ends in a magnetization direction of the permanent magnet. The coil is capable of changing an intensity of the magnetic field applied to the magnetic working substance. The coil is provided in at least one of the closed magnetic circuits. The magnetic field application unit is disposed in at least one of the closed magnetic circuits. The magnetic field application unit, the permanent magnet, the yoke and the coil are configured such that a magnetic flux of the permanent magnet is branched to flow through two or more of the closed magnetic circuits including the closed magnetic circuit provided with the magnetic field application unit when the coil is non-energized.

BRIEF DESCRIPTION OF THE DRAWINGS

FIG. 33 is a view similar to FIG. 32, in which a positive current flows through the coil.

FIG. 34 is a front view schematically illustrating a configuration of a magnetic field application device according to a second reference example, in which a coil is non-energized.

DETAILED DESCRIPTION OF EMBODIMENT(S)

First Embodiment

The first embodiment will be described below. A magnetic field application device (20) of the present embodiment controls the temperature of a heating medium (e.g., water) by means of a magnetocaloric effect, and is provided in an air-conditioning system (10) configured as, for example, a chiller for cooling purpose only. Note that the use of the magnetic field application device (20) is not limited to this. For example, the magnetic field application device (20) may be provided for apparatuses such as an air conditioner and a refrigerator.

Configuration of Air-Conditioning System

Figure 1:
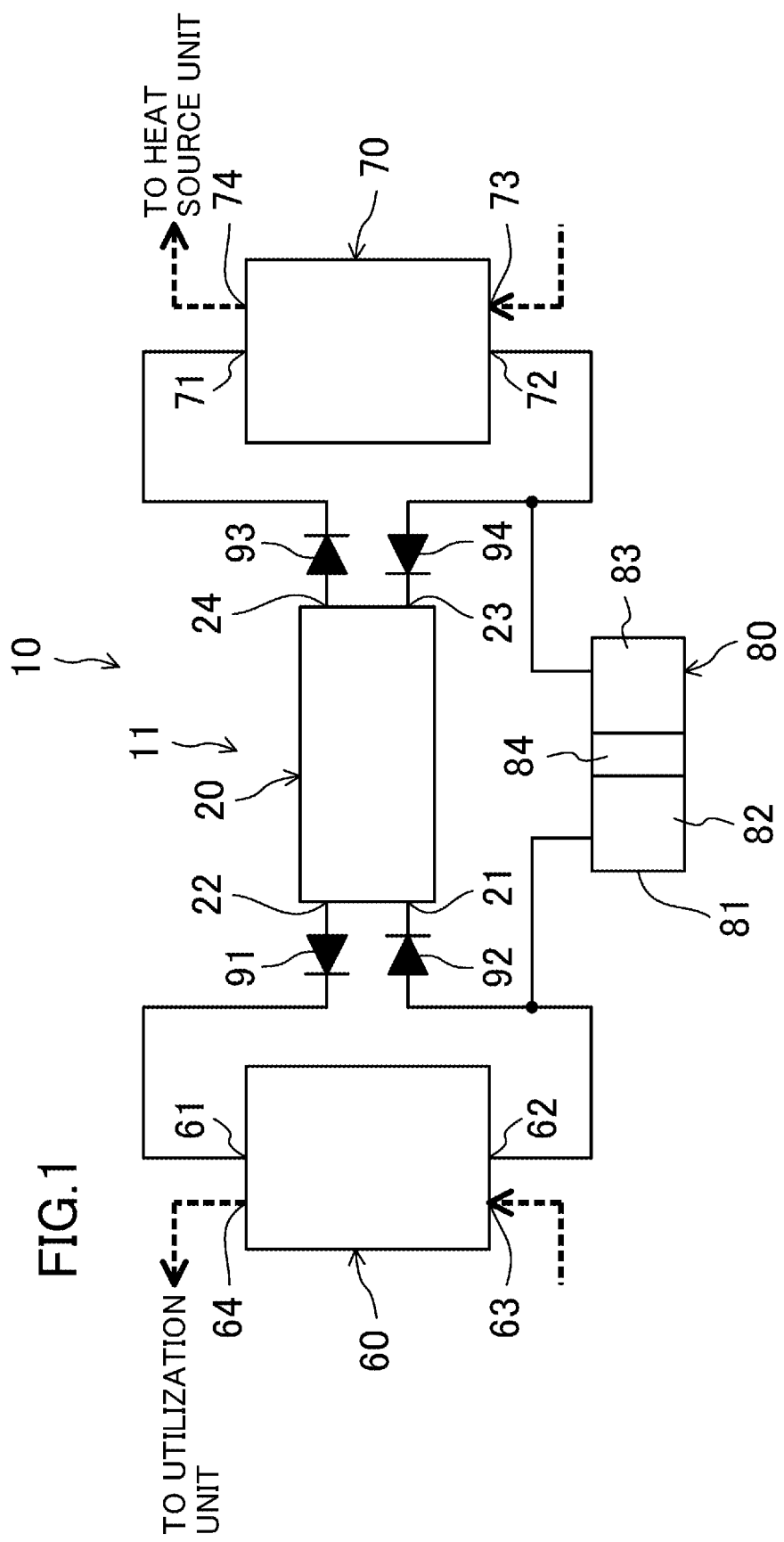
FIG. 1 is a circuit diagram schematically illustrating a configuration of an air-conditioning system according to a first embodiment.

FIG. 1 is a circuit diagram schematically illustrating a configuration of the air-conditioning system (10) according to the first embodiment. As shown in this figure, the air-conditioning system (10) includes a heating medium circuit (11) provided with the magnetic field application device (20), a low-temperature heat exchanger (60), a high-temperature heat exchanger (70), and a heating medium pump (80). The components of the heating medium circuit (11) are connected together through heating medium pipes.

The magnetic field application device (20) includes a magnetic working substance (27), and applies or removes a magnetic field to or from the magnetic working substance (27) to cause a magnetocaloric effect, thereby heating or cooling the heating medium flowing inside the magnetic working substance (27). The magnetic field application device (20) has a low-temperature inlet (21), a low-temperature outlet (22), a high-temperature inlet (23), and a high-temperature outlet (24). The inlets (21, 23) and the outlets (22, 24) communicate with the interior space of a magnetic field application unit (25) (see FIG. 2) of the magnetic field application device (20). A heating medium that has entered from the low-temperature inlet (21) flows through the magnetic field application unit (25), and is discharged from the high-temperature outlet (24). A heating medium that has entered from the high-temperature inlet (23) flows through the magnetic field application unit (25), and is discharged from the low-temperature outlet (22). The configuration of the magnetic field application device (20) will be described in detail later.

The low-temperature heat exchanger (60) causes heat exchange between the heating medium cooled in the magnetic field application device (20) and a secondary refrigerant flowing through a utilization unit (such as an air handling unit), which is not illustrated. The low-temperature heat exchanger (60) has a first inflow port (61) connected to the low-temperature outlet (22) of the magnetic field application device (20), a first outflow port (62) connected to the low-temperature inlet (21) of the magnetic field application device (20), and a third inflow port (63) and a third outflow port (64) both connected to the utilization unit.

Here, a heating medium pipe between the low-temperature outlet (22) and the first inflow port (61) is provided with a first check valve (91) which allows a heating medium to flow from the former to the latter, while preventing the heating medium from flowing in the reverse direction. A heating medium pipe between the low-temperature inlet (21) and the first outflow port (62) is provided with a second check valve (92) which allows the heating medium to flow from the latter to the former, while preventing the heating medium from flowing in the reverse direction.

The high-temperature heat exchanger (70) causes heat exchange between the heating medium heated in the magnetic field application device (20) and a secondary refrigerant flowing through a heat source unit (such as a cooling tower), which is not illustrated. The high-temperature heat exchanger (70) has a second inflow port (71) connected to the high-temperature outlet (24) of the magnetic field application device (20), a second outflow port (72) connected to the high-temperature inlet (23) of the magnetic field application device (20), and a fourth inflow port (73) and a fourth outflow port (74) both connected to the heat source unit.

Here, a heating medium pipe between the high-temperature outlet (24) and the second inflow port (71) is provided with a third check valve (93) which allows the heating medium to flow from the former to the latter, while preventing the heating medium from flowing in the reverse direction. A heating medium pipe between the high-temperature inlet (23) and the second outflow port (72) is provided with a fourth check valve (94) which allows the heating medium to flow from the latter to the former, while preventing the heating medium from flowing in the reverse direction.

The heating medium pump (80) allows the heating medium to flow between the magnetic field application device (20) and the heat exchangers (60, 70). The heating medium pump (80) is configured as a piston pump in this example, and includes a cylinder (81) and a piston (84) disposed therein. The cylinder (81) is partitioned into a first chamber (82) and a second chamber (83) by the piston (84). The first chamber (82) communicates with a portion of the heating medium pipe between the low-temperature heat exchanger (60) and the second check valve (92), and the second chamber (83) communicates with a portion of the heating medium pipe between the high-temperature heat exchanger (70) and the fourth check valve (94).

The heating medium pump (80) is configured to have its piston (84) reciprocated in the cylinder (81) to perform a first operation for discharging the heating medium from the first chamber (82) and sucking the heating medium into the second chamber (83), and a second operation for discharging the heating medium from the second chamber (83) and sucking the heating medium into the first chamber (82).

Configuration of Magnetic Field Application Device

Figure 2:
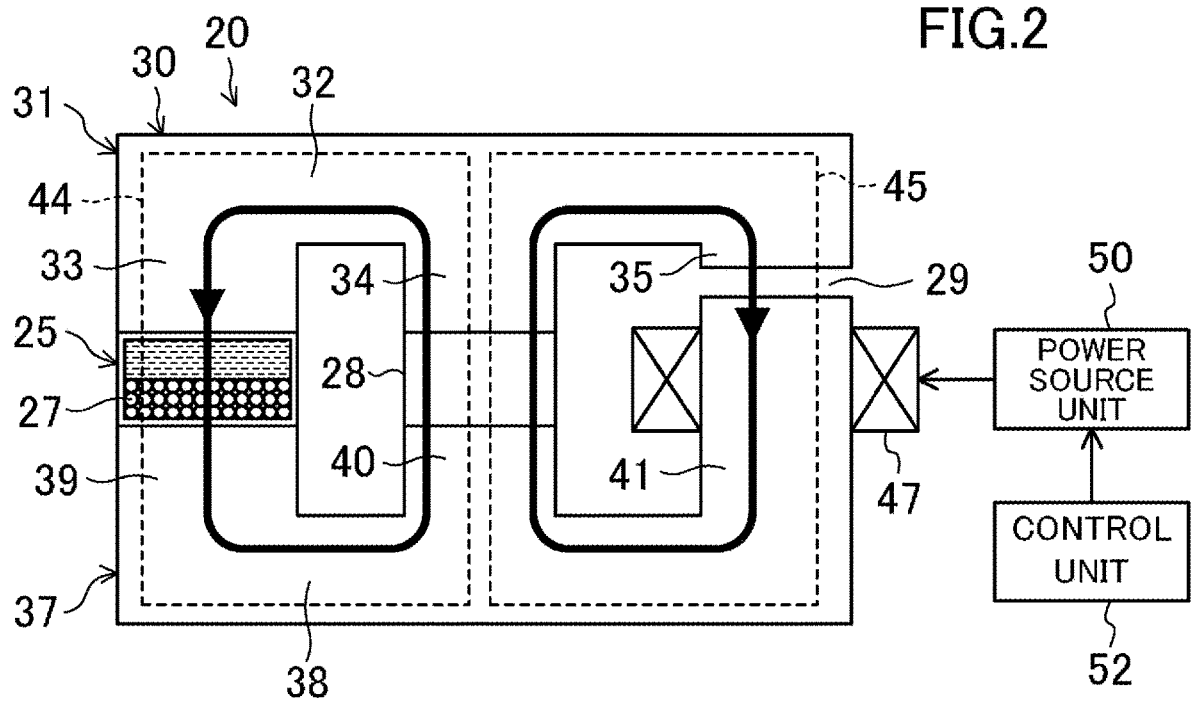
FIG. 2 is a front view schematically illustrating a configuration of a magnetic field application device according to the first embodiment, in which a coil is non-energized.

FIG. 2 is a front view schematically illustrating a configuration of the magnetic field application device (20). As shown in this figure, the magnetic field application device (20) includes a magnetic field application unit (25), a permanent magnet (28), a magnetic resistance portion (29), a yoke (30), a coil (47), a power source unit (50), and a control unit (52). In the drawings, solid line arrows indicate a magnetic field generated by the permanent magnet (28), and broken line arrows indicate a magnetic field generated by the coil (47).

The magnetic field application unit (25) is comprised of an AMR bed which houses the magnetic working substance (27) and in which the heating medium flows. The magnetic working substance (27) generates heat when a magnetic field is applied thereto, and absorbs heat when the magnetic field is removed therefrom. Examples of the material of the magnetic working substance (27) include, e.g., $Gd_5(Ge_{0.5}Si_{0.5})_4$, $La(Fe_{1-x}Si_x)_{13}$, $La(Fe_{1-x}Co_xSi_y)_{13}$, $La(Fe_{1-x}Si_x)_{13}H_y$, and $Mn(As_{0.9}Sb_{0.1})$.

The permanent magnet (28) is a sintered magnet having a rectangular parallelepiped shape, and contains neodymium. The permanent magnet (28) is magnetized in the vertical direction so that an upper end thereof serves as an N-pole and a lower end thereof as an S-pole. As shown in FIG. 2, the permanent magnet (28) produces a magnetic flux that flows through both of the magnetic field application unit (25) and the magnetic resistance portion (29) when the coil (47) is non-energized. Specifically, the magnetic flux of the permanent magnet (28) is branched to flow through all of closed magnetic circuits (44, 45) when the coil (47) is non-energized. A magnetic flux density in the magnetic working substance (27) at this time is assumed to be B0 in FIG. 5. The permanent magnet (28) may be magnetized in the vertical direction so that the upper end serves as an S-pole and the lower end as an N-pole.

The magnetic resistance portion (29) is formed of an air gap. The magnetic resistance portion (29) may be made of a non-magnetic material such as resin, or a magnetic material having a magnetic permeability $\mu$ smaller than that of a material of the yoke (30).

The yoke (30) includes a first yoke member (31) and a second yoke member (37) each formed in a substantially E shape. The first yoke member (31) and the second yoke member (37) are made of a magnetic material.

The first yoke member (31) has an upper coupling portion (32) extending to the left and the right in FIG. 2, a first upper arm portion (33) that protrudes downward from one end (left end in FIG. 2) of the upper coupling portion (32), a second upper arm portion (34) that protrudes downward from the center of the upper coupling portion (32), and a third upper arm portion (35) that protrudes downward from the other end (right end in FIG. 2) of the upper coupling portion (32).

The second yoke member (37) has a lower coupling portion (38) extending to the left and the right in FIG. 2, a first lower arm portion (39) that protrudes upward from one end (left end in FIG. 2) of the lower coupling portion (38), a second lower arm portion (40) that protrudes upward from the center of the lower coupling portion (38), and a third lower arm portion (41) that protrudes upward from the other end (right end in FIG. 2) of the lower coupling portion (38).

The magnetic field application unit (25) is supported between the first upper arm portion (33) and the first lower arm portion (39). The permanent magnet (28) is supported between the second upper arm portion (34) and the second lower arm portion (40). An air gap is formed as the magnetic resistance portion (29) between the third upper arm portion (35) and the third lower arm portion (41).

The yoke (30) forms a first closed magnetic circuit (44) which is a closed circuit that magnetically connects the magnetic field application unit (25) and the permanent magnet (28) in series via the first upper arm portion (33), the upper coupling portion (32), the second upper arm portion (34), the second lower arm portion (40), the lower coupling portion (38), and the first lower arm portion (39). The yoke (30) also forms a second closed magnetic circuit (45) which is a closed circuit that magnetically connects the permanent magnet (28) and the air gap as the magnetic resistance portion (29) in series via the second upper arm portion (34), the upper coupling portion (32), the third upper arm portion (35), the third lower arm portion (41), the lower coupling portion (38), and the second lower arm portion (40).

In other words, the yoke (30) forms the first closed magnetic circuit (44) and the second closed magnetic circuit (45) each of which is a closed circuit that magnetically connects both ends in the magnetization direction of the permanent magnet (28). The first closed magnetic circuit (44) is provided with the magnetic field application unit (25), while the second closed magnetic circuit (45) is provided with the air gap as the magnetic resistance portion (29).

Figure 3:
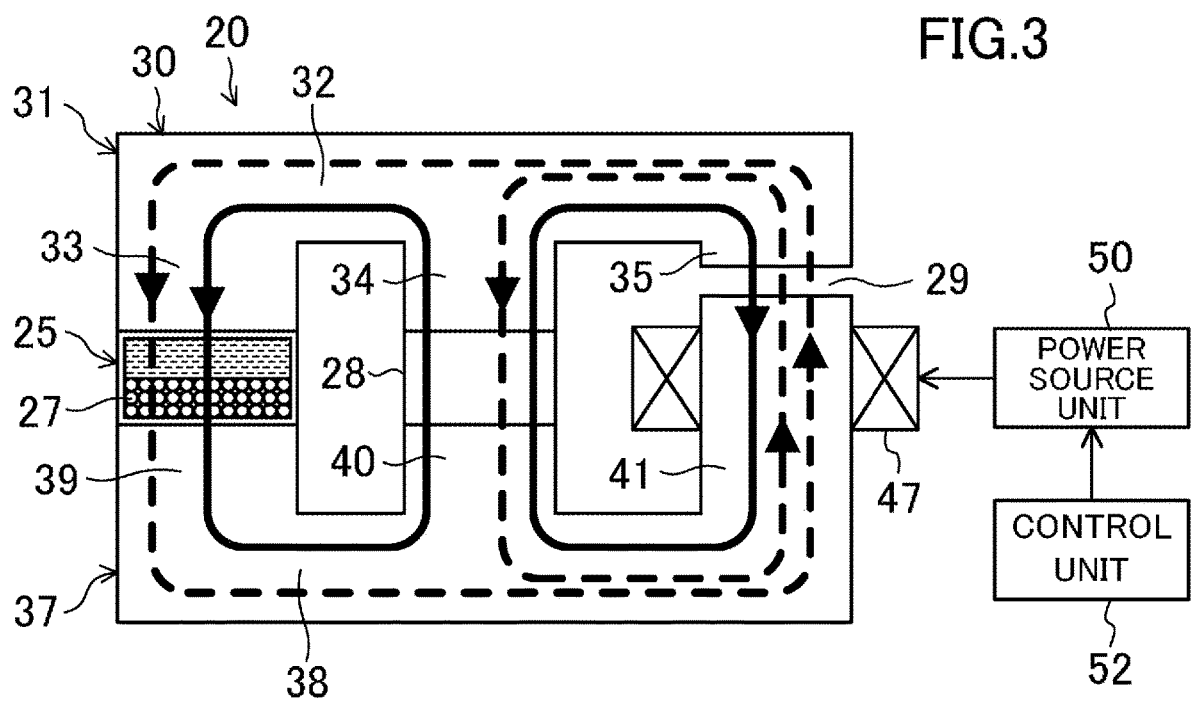
FIG. 3 is a view similar to FIG. 2, in which a positive current flows through the coil.

The coil (47) is provided for the second closed magnetic circuit (45), more specifically, on the third lower arm portion (41). When a positive current (i.e., a current for generating an upward magnetic field in the coil (47)) flows through the coil (47), the magnetic field applied to the magnetic field application unit (25) is strengthened (see FIG. 3). When a negative current (i.e., a current for generating a downward magnetic field in the coil (47)) flows through the coil (47), the magnetic field applied to the magnetic field application unit (25) is weakened (see FIG. 4).

The power source unit (50) is a device connected to the coil (47) and causes the current to flow through the coil (47). The power source unit (50) is configured to allow, for example, rectangular positive and negative currents to flow through the coil (47).

The control unit (52) is a device connected to the power source unit (50) and controls the current flowing through the coil (47). The control unit (52) controls the current flowing through the coil (47) so that the current selectively flows in directions in which the magnetic field applied to the magnetic working substance (27) is strengthened and weakened. Specifically, the control unit (52) controls the power source unit (50) so that the positive current and the negative current selectively flow through the coil (47).

Suppose that the magnetic field application unit (25) has a magnetic resistance Ramr, that the permanent magnet (28) has a magnetic resistance Rmag, and that the magnetic resistance portion (29) has a magnetic resistance R1. Further, suppose that Rmag/Ramr=k1 and R1/Ramr=k2 are satisfied. In this case, the magnetic field application device (20) is designed to satisfy $(k1+k2+k1 \cdot k2)/k1 < \sqrt{2}$.

Here, the yoke (30) is assumed to have a magnetic resistance which is sufficiently smaller than Ramr, Rmag, and R1, and is negligible. If the magnetic resistance of the yoke (30) is large and cannot be ignored, the magnetic resistance of the yoke (30) needs to be added to Ramr, Rmag, and R1. In such a case, for example, Ramr is the sum of the magnetic resistances of part of the upper coupling portion (32) on the left of the second upper arm portion (34), the first upper arm portion (33), the magnetic field application unit (25), the first lower arm portion (39), and part of the lower coupling portion (38) on the left of the second lower arm portion (40). Rmag is the sum of the magnetic resistances of the second upper arm portion (34), the permanent magnet (28), and the second lower arm portion (40). R1 is the sum of the magnetic resistances of part of the upper coupling portion (32) on the right of the second upper arm portion (34), the third upper arm portion (35), the magnetic resistance portion (29), the third lower arm portion (41), and part of the lower coupling portion (38) on the right of the second lower arm portion (40).

Further, suppose that part of the first closed magnetic circuit (44) excluding the permanent magnet (28) (i.e., a portion extending from the second upper arm portion (34) to the second lower arm portion (40) via the magnetic field application unit (25)) has a magnetic resistance R1, and that part of the second closed magnetic circuit (45) excluding the permanent magnet (28) (i.e., a portion extending from the second upper arm portion (34) to the second lower arm portion (40) via the magnetic resistance portion (29)) has a magnetic resistance R2. In this case, the magnetic field application device (20) is designed to satisfy 0.01×R1≤R2≤100×R1.

Operation

Next, the operation of the air-conditioning system (10) and the magnetic field application device (20) will be described below.

The air-conditioning system (10) causes the heating medium pump (80) to alternately perform the first and second operations, and allows a positive or negative current to flow through the coil (47) of the magnetic field application device (20) in response to these operations. This allows cold thermal energy to be supplied to the utilization unit.

Figure 4:
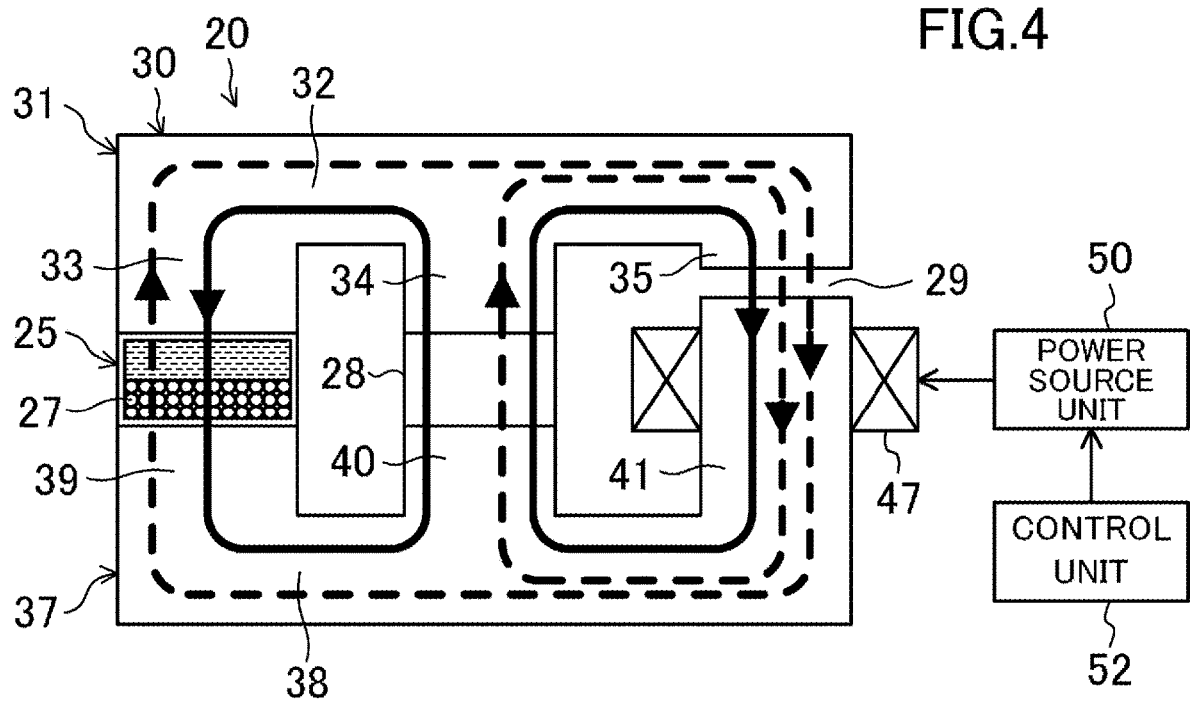
FIG. 4 is a view similar to FIG. 2, in which a negative current flows through the coil.

Specifically, first, while the flow of the heating medium is stopped, a positive current is allowed to flow through the coil (47) of the magnetic field application device (20). This causes the magnetic field of the permanent magnet (28) and the magnetic field of the coil (47) to be superimposed on the magnetic working substance (27) in the magnetic field application unit (25) as shown in FIG. 4, and the magnetic working substance (27) generates heat. The magnetic flux density in the magnetic working substance (27) at this time is taken as Bmax in FIG. 5. When the heating medium pump (80) performs the first operation in this state, the piston (84) moves to the left in FIG. 1, and the heating medium is discharged from the first chamber (82). The heating medium discharged from the first chamber (82) flows into the magnetic field application unit (25) through the second check valve (92). In the magnetic field application unit (25), the heating medium is heated through heat exchange with the heat-generating magnetic working substance (27), and is then pushed out by the heating medium flowing into the magnetic field application unit (25). The heated heating medium flows into the high-temperature heat exchanger (70) through the third check valve (93), dissipates heat to the secondary refrigerant in the heat source unit, and flows out of the high-temperature heat exchanger (70). The heating medium that has flowed out of the high-temperature heat exchanger (70) is sucked into the second chamber (83) of the heating medium pump (80).

Figure 5:
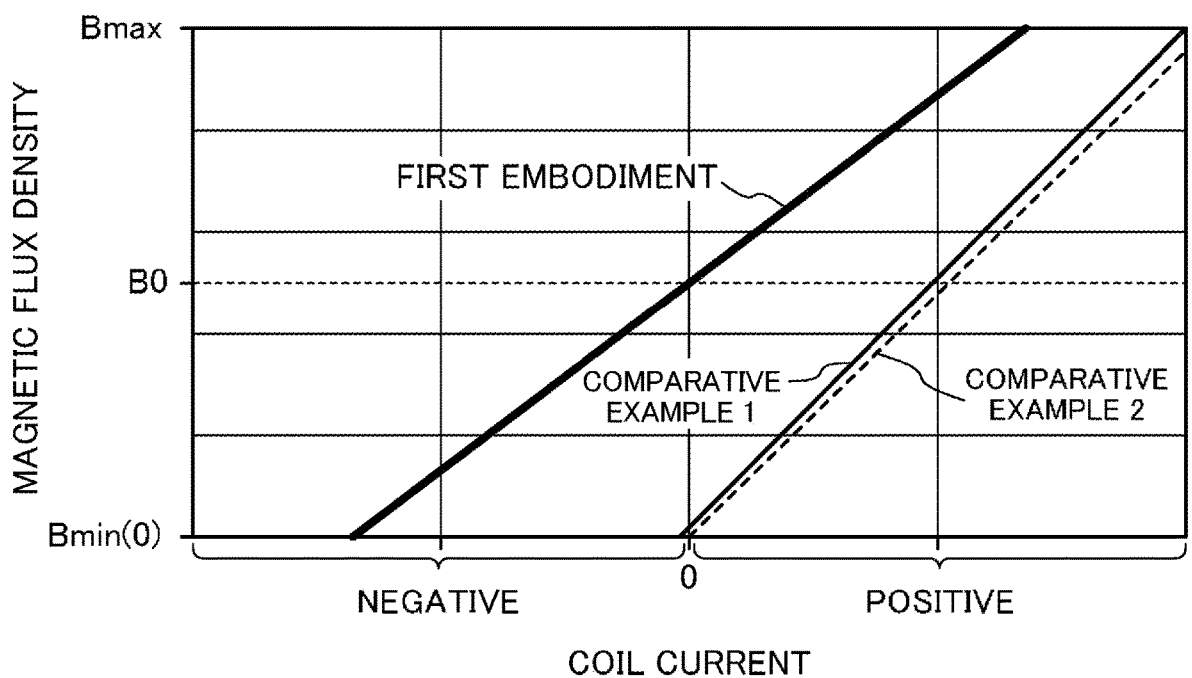
FIG. 5 is a graph showing the relationship between a coil current and a magnetic flux density in a magnetic working substance in the magnetic field application device of the first embodiment and magnetic field application devices of Comparative Examples.

Then, while the flow of the heating medium is stopped, a negative current is allowed to flow through the coil (47) of the magnetic field application device (20). This removes the magnetic field from the magnetic working substance (27) in the magnetic field application unit (25) as shown in FIG. 5 (i.e., the magnetic field of the permanent magnet (28) is canceled out by the magnetic field of the coil (47)), and the magnetic working substance (27) absorbs heat. The magnetic flux density in the magnetic working substance (27) at this time is taken as Bmin in FIG. 5. When the heating medium pump (80) performs the second operation in this state, the piston (84) moves to the right in FIG. 1, and the heating medium is discharged from the second chamber (83). The heating medium discharged from the second chamber (83) flows into the magnetic field application unit (25) through the fourth check valve (94). In the magnetic field application unit (25), the heating medium is cooled through heat exchange with the heat-absorbing magnetic working substance (27), and is then pushed out by the heating medium flowing into the magnetic field application unit (25). The cooled heating medium flows into the low-temperature heat exchanger (60) through the first check valve (91), cools the secondary refrigerant of the utilization unit, and flows out of the low-temperature heat exchanger (60). The heating medium that has flowed out of the low-temperature heat exchanger (60) is sucked into the first chamber (82) of the heating medium pump (80).

Repeating the foregoing operations allows cold thermal energy to be supplied to the low-temperature heat exchanger (60), and allows warm thermal energy to be supplied to the high-temperature heat exchanger (70). Thus, the utilization unit can cool a target space.

Relationship Between Coil Current and Magnetic Flux Density in Magnetic Working Substance Referring to FIG. 5, the relationship between the coil current and the magnetic flux density in the magnetic working substance (27) in each of the magnetic field application device (20) of the first embodiment, a magnetic field application device of Comparative Example 1, and a magnetic field application device of Comparative Example 2 will be described below. The magnetic field application device of Comparative Example 1 is a magnetic field application device according to Patent Document 1 shown in FIG. 3, and the magnetic field application device of Comparative Example 2 is the magnetic field application device of Comparative Example 1 from which the permanent magnet is removed.

As shown in FIG. 5, when no current flows through the coil (47), the magnetic flux density in the magnetic working substance (27) of the magnetic field application device (20) of the first embodiment is B0 which is larger than zero (i.e., the magnetic field application device (20) is designed to satisfy B0>0). When no current flows through the coil, the magnetic flux densities in the magnetic working substances of the magnetic field application devices of Comparative Examples 1 and 2 are substantially Bmin=0. A current that is allowed to flow through the coil (47) (i.e., the maximum positive current) in order to increase the magnetic flux density in the magnetic working substance (27) to Bmax is smaller in the magnetic field application device (20) of the first embodiment than that required in each of Comparative Examples 1 and 2. On the other hand, in the magnetic field application device (20) of the first embodiment, a negative current (i.e., a maximum negative current) is required to flow through the coil (47) to set the magnetic flux density in the magnetic working substance (27) to be Bmin.

As can be seen from FIG. 5, the control unit (52) is configured to control the current flowing through the coil (47) such that |Bmin|<B0<Bmax is satisfied. The control unit (52) is also configured to control the current flowing through the coil (47) such that |Bmin| becomes zero. The air gap provided as the magnetic resistance portion (29) is designed to satisfy B0≈(Bmax−Bmin)/2. The magnetic field application device (20) is designed to satisfy 0.1×Bmax≤B0≤0.5×Bmax.

Advantages of First Embodiment

The magnetic field application device (20) of the present embodiment includes: a magnetic field application unit (25) provided with a magnetic working substance (27) and applying a magnetic field to the magnetic working substance (27); a permanent magnet (28); and a yoke (30) that forms first and second closed magnetic circuits (44, 45) each of which is a closed circuit that magnetically connects both ends in a magnetization direction of the permanent magnet (28). The magnetic field application unit (25) is provided in the first closed magnetic circuit (44). The magnetic field application device (20) includes a coil (47) capable of changing an intensity of a magnetic field applied to the magnetic working substance (27). The coil (47) is provided in the second closed magnetic circuit (45). The magnetic field application device (20) is configured such that a magnetic flux of the permanent magnet (28) is branched to flow through the first and second closed magnetic circuits (44, 45) including the first closed magnetic circuit (44) provided with the magnetic field application unit (25) when the coil (47) is non-energized. Thus, when the coil (47) is non-energized, at least part of the magnetic flux of the permanent magnet (28) flows through the magnetic field application unit (25). That is, when the coil (47) is non-energized, a magnetic field generated by the permanent magnet (28) is applied to the magnetic working substance (27) of the magnetic field application unit (25). Then, when the current flows through the coil (47) in the magnetic field application device (20), the intensity of the magnetic field applied to the magnetic working substance (27) changes, which makes the magnetic working substrate (27) cause a magnetocaloric effect. As described above, in the magnetic field application device (20) of the present embodiment, the magnetic field is applied to the magnetic working substance (27) even when the coil (47) is non-energized. Therefore, the current required to flow through the coil (47) to increase the magnetic flux density in the magnetic working substance (27) to the desired degree can be smaller, for example, than that required in the known magnetic field application device in which no magnetic field is applied to the magnetic working substance (27) when the coil (47) is non-energized. This can reduce the maximum value of the current flowing through the coil (47) in the magnetic field application device (20).

The magnetic field application device (20) of the present embodiment is designed to satisfy $0.01 \times R1 \leq R2 \leq 100 \times R1$, where R1 is the magnetic resistance of part of the first closed magnetic circuit (44) excluding the permanent magnet (28), and R2 is the magnetic resistance of part of the second closed magnetic circuit (45) excluding the permanent magnet (28). Thus, the magnetic flux of the permanent magnet (28) is branched to flow through the first closed magnetic circuit (44) and the second closed magnetic circuit (45) in a ratio corresponding to the magnetic resistances R1 and R2.

The magnetic field application device (20) of the present embodiment is designed to satisfy $0.1 \times Bmax \leq B0 \leq 0.5 \times Bmax$, where Bmax is a magnetic flux density in the magnetic working substance (27) when a maximum current flows through the coil (47) in a direction in which the magnetic field applied to the magnetic working substance (27) is strengthened, and B0 is a magnetic flux density in the magnetic working substance (27) when the coil (47) is non-energized. Thus, the magnetic flux density in the magnetic working substance (27) has a certain magnitude even when the coil (47) is non-energized. Specifically, the magnetic flux density B0 in the magnetic working substance (27) when the coil (47) is non-energized has a magnitude which is 0.1 to 0.5 times larger than the magnetic flux density Bmax.

The magnetic field application device (20) of the present embodiment includes the magnetic resistance portion (29) provided in the second closed magnetic circuit (45) having no magnetic field application unit (25). Thus, the magnetic resistance of the second closed magnetic circuit (45) provided with the magnetic resistance portion (29) can be adjusted by the magnetic resistance portion (29). This facilitates the adjustment of the magnetic resistance of the second closed magnetic circuit (45). Further, since the yoke (30) can be configured to have a sufficiently small magnetic resistance with respect to the magnetic field application unit (25, 26), the magnetic resistance of the closed magnetic circuit (44) other than the second closed magnetic circuit (45) can be reduced.

In the magnetic field application device (20) of the present embodiment, the magnetic resistance portion (29) is formed of an air gap or a non-magnetic body. Thus, the air gap or the non-magnetic body increases the magnetic resistance of the second closed magnetic circuit (45) in which the air gap or the non-magnetic material is provided.

The magnetic field application device (20) of the present embodiment includes the control unit (52) that controls the current flowing through the coil (47) such that the current selectively flows in the directions in which the magnetic field applied to the magnetic working substance (27) is strengthened and weakened. Thus, when the control unit (52) controls the current flowing through the coil (47) such that the current flows in the direction in which the magnetic field applied to the magnetic working substance (27) is strengthened, a relatively strong magnetic field is applied to the magnetic working substance (27), which causes the magnetic working material (27) to generate heat. When the control unit (52) controls the current flowing through the coil (47) such that the current flows in the direction in which the magnetic field applied to the magnetic working substance (27) is weakened, a relatively weak magnetic field is applied to the magnetic working substance (27), which causes the magnetic working material (27) to absorb heat.

The magnetic field application device (20) of the present embodiment is designed to satisfy $B0 \approx (Bmax - Bmin)/2$, where Bmax is a magnetic flux density in the magnetic working substance (27) when the maximum current flows through the coil (47) in the direction in which the magnetic field applied to the magnetic working substance (27) is strengthened, Bmin is a magnetic flux density in the magnetic working substance (27) when the maximum current flows through the coil (47) in the direction in which the magnetic field applied to the magnetic working substance (27) is weakened, and B0 is a magnetic flux density in the magnetic working substance (27) when the coil (47) is non-energized. Thus, the absolute value of the current flowing through the coil (47) when the magnetic flux density in the magnetic working substance (27) is Bmax becomes substantially equal to the absolute value of the current flowing through the coil (47) when the magnetic flux density is Bmin. This can reduce the maximum value of the absolute value of the current flowing through the coil (47). As a result, copper loss of the coil (47) can be reduced.

In the magnetic field application device (20) of the present embodiment, the control unit (52) is configured to control the current flowing through the coil (47) such that $|Bmin| < B0 < Bmax$ is satisfied, where Bmax is a magnetic flux density in the magnetic working substance (27) when the maximum current flows through the coil (47) in the direction in which the magnetic field applied to the magnetic working substance (27) is strengthened, Bmin is a magnetic flux density in the magnetic working substance (27) when the maximum current flows through the coil (47) in the direction in which the magnetic field applied to the magnetic working substance (27) is weakened, and B0 is a magnetic flux density in the magnetic working substance (27) when the coil (47) is non-energized. Thus, the magnetic field application device (20) can have a wider operation region than in the case where the control is made to satisfy |Bmin|≥B0, for example.

In the magnetic field application device (20) of the present embodiment, the control unit (52) is configured to control the current flowing through the coil (47) such that |Bmin| becomes zero. This can cause the magnetic working substance (27) to exert the maximum magnetocaloric effect.

Further, in the magnetic field application device (20) of the present embodiment, the closed magnetic circuits include the first closed magnetic circuit (44) provided with the magnetic field application unit (25), and the second closed magnetic circuit (45) provided with the magnetic resistance portion (29), and the coil (47) is provided in the second closed magnetic circuit (45). Thus, the magnetic field application unit (25) is provided in the first closed magnetic circuit (44), and the magnetic resistance portion (29) and the coil (47) are provided in the second closed magnetic circuit (45). This creates a relatively large distance between the magnetic field application unit (25) and the coil (47), and the magnetic field application unit (25) is not easily affected by the heat generated when the current flows through the coil (47).

The magnetic field application device (20) of the present embodiment is designed to satisfy $(k1+k2+k1\cdot k2)/k1<\sqrt{2}$, where Ramr is a magnetic resistance of the magnetic field application unit (25), Rmag is a magnetic resistance of the permanent magnet (28), R1 is a magnetic resistance of the magnetic resistance portion (29), Rmag/Ramr=k1, and R1/Ramr=k2. Thus, when the magnetic working substance (27) causes the magnetocaloric effect of the same degree in both the presence and absence of the magnetic resistance portion (29), the copper loss in the coil (47) can be reduced in the presence of the magnetic resistance portion (29).

In the magnetic field application device (20) of the present embodiment, the yoke (30) includes a plurality of yoke members (31, 37), i.e., the first and second yoke members (31, 37). Therefore, in assembling the magnetic field application device (20), a step of assembling the coil (47), which has been wound around a bobbin (not shown), and the yoke members (31, 37) can be employed. This can reduce the number of steps and lead time.

First Variation of First Embodiment

A first variation of the first embodiment will be described below. A magnetic field application device (20) according to this variation includes a yoke (30) and a magnetic resistance portion (29) configured in a different manner from those of the magnetic field application device of the first embodiment. Thus, differences from the first embodiment will be mainly described below.

Figure 6:
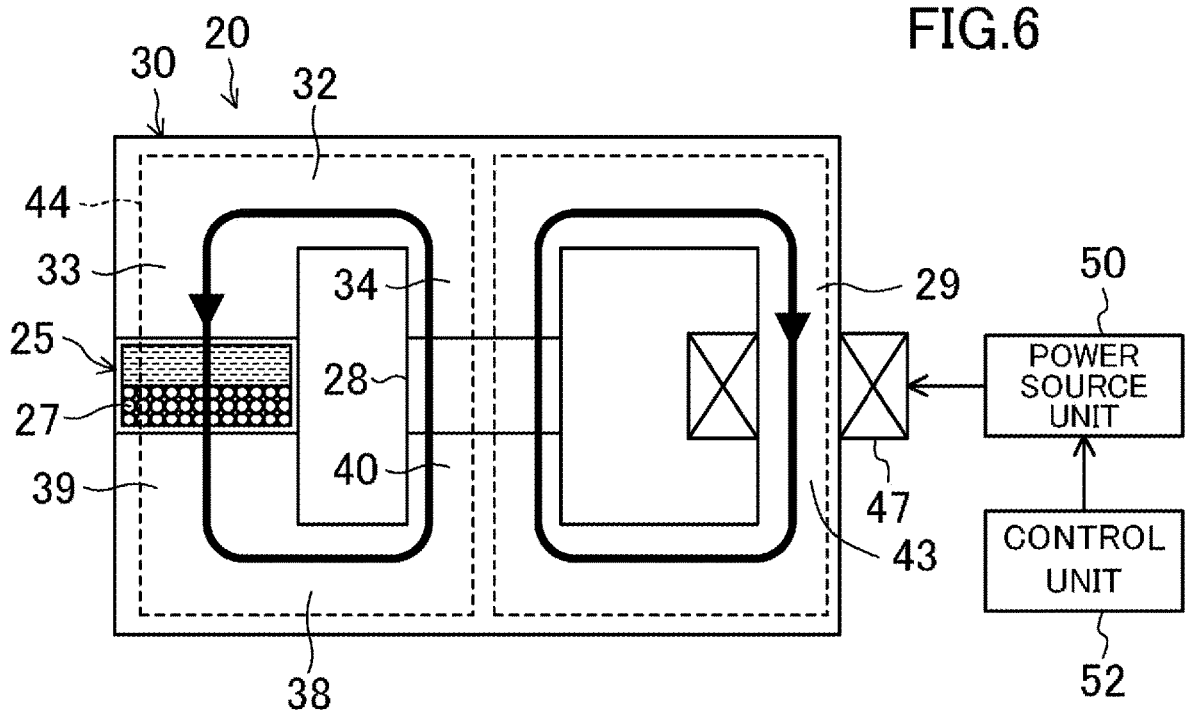
FIG. 6 is a front view schematically illustrating a configuration of a magnetic field application device according to a first variation of the first embodiment, in which the coil is non-energized.
Figure 7:
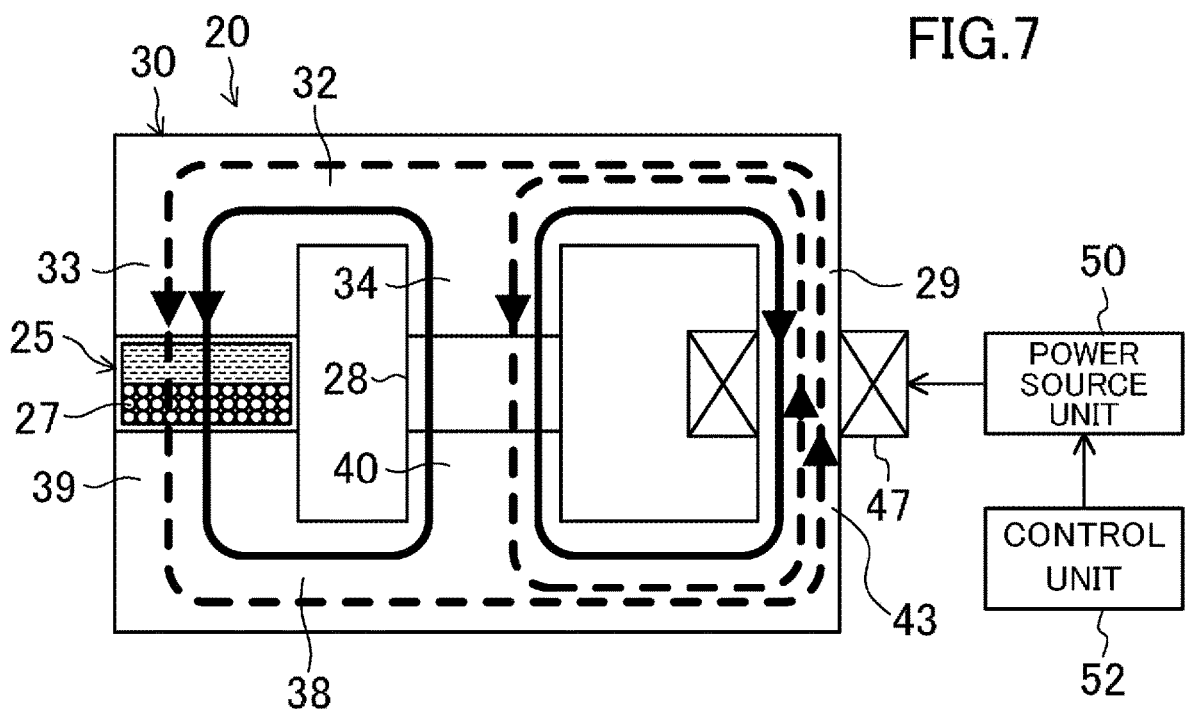
FIG. 7 is a view similar to FIG. 6, in which a positive current flows through the coil.
Figure 8:
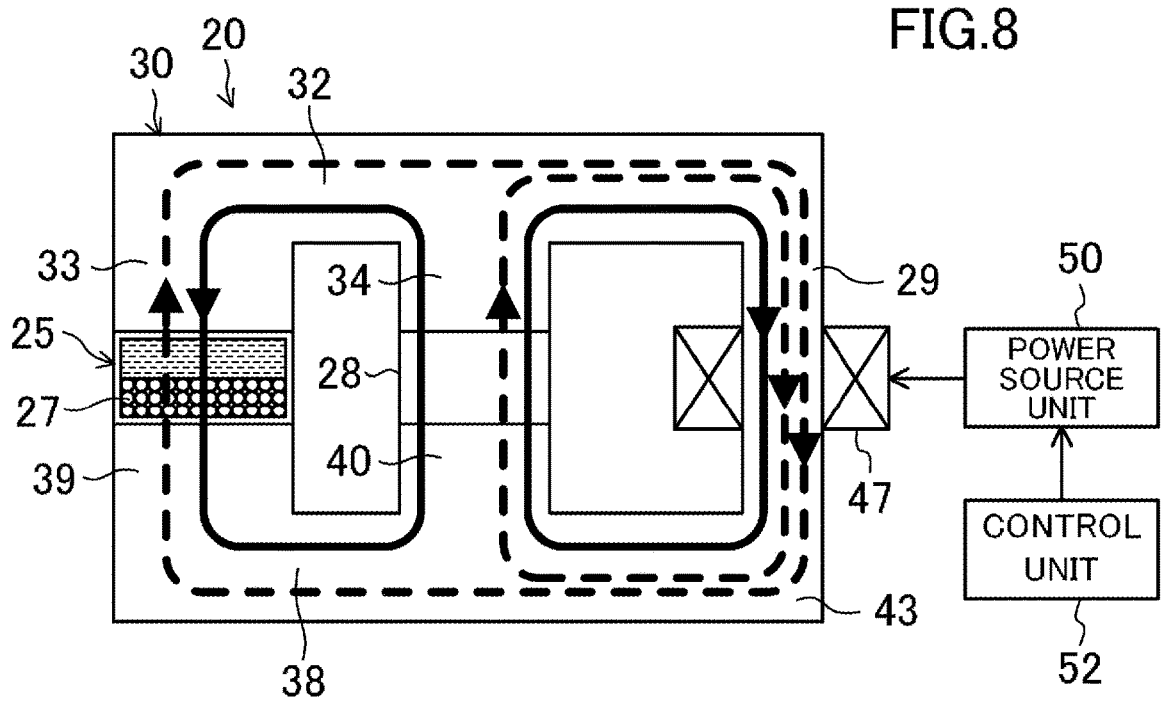
FIG. 8 is a view similar to FIG. 6, in which a negative current flows through the coil.

As shown in FIGS. 6 to 8, the yoke (30) has a shape in which the third upper arm portion (35) of the first yoke member (31) and the third lower arm portion (41) of the second yoke member (37) of the first embodiment are integrally connected to each other. Portions corresponding to the third upper arm portion (35) and the third lower arm portion (41) of the first embodiment are formed into a pillar portion (43) which is narrower than these arm portions. The pillar portion (43) constitutes a magnetic resistance portion (29) of the present variation. Further, a portion corresponding to the upper coupling portion (32) of the first embodiment serves as an upper beam portion (32), and a portion corresponding to the lower coupling portion (38) serves as a lower beam portion (38). The present variation is the same as the first embodiment except for these points.

Also in the present variation, the same advantages as those of the first embodiment are obtained.

Second Variation of First Embodiment

A second variation of the first embodiment will be described below. A magnetic field application device (20) according to this variation includes a coil (47) arranged in a different manner from that of the magnetic field application device of the first embodiment. Thus, differences from the first embodiment will be mainly described below.

Figure 9:
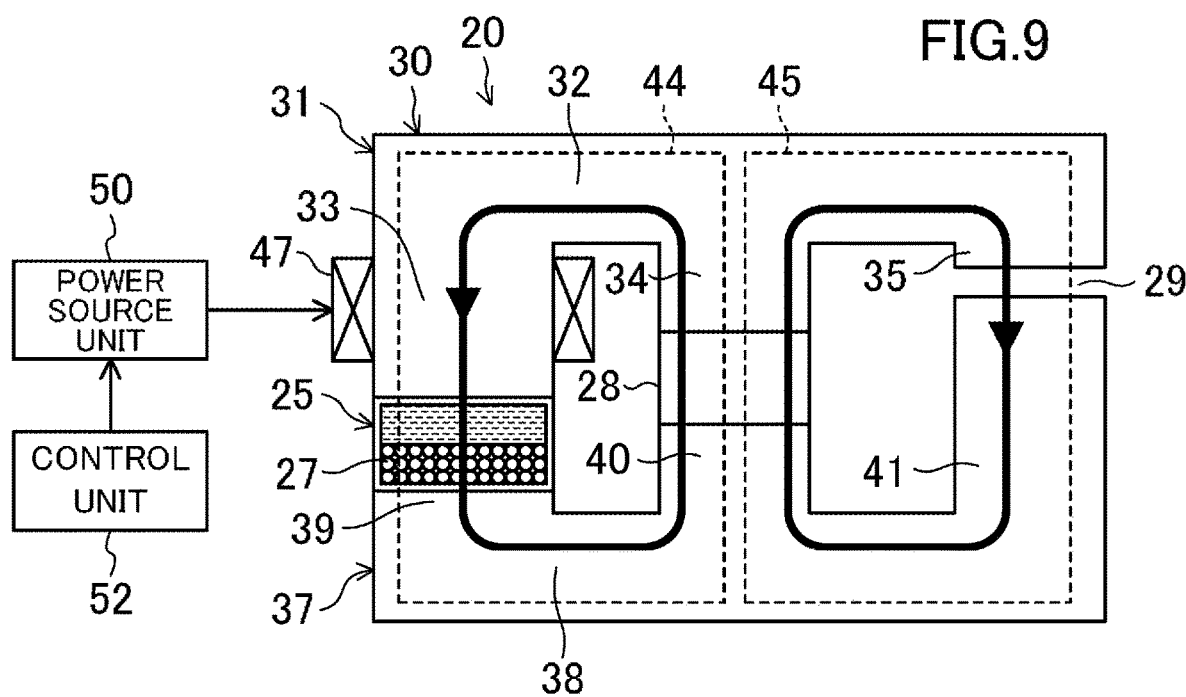
FIG. 9 is a front view schematically illustrating a configuration of a magnetic field application device according to a second variation of the first embodiment, in which the coil is non-energized.
Figure 10:
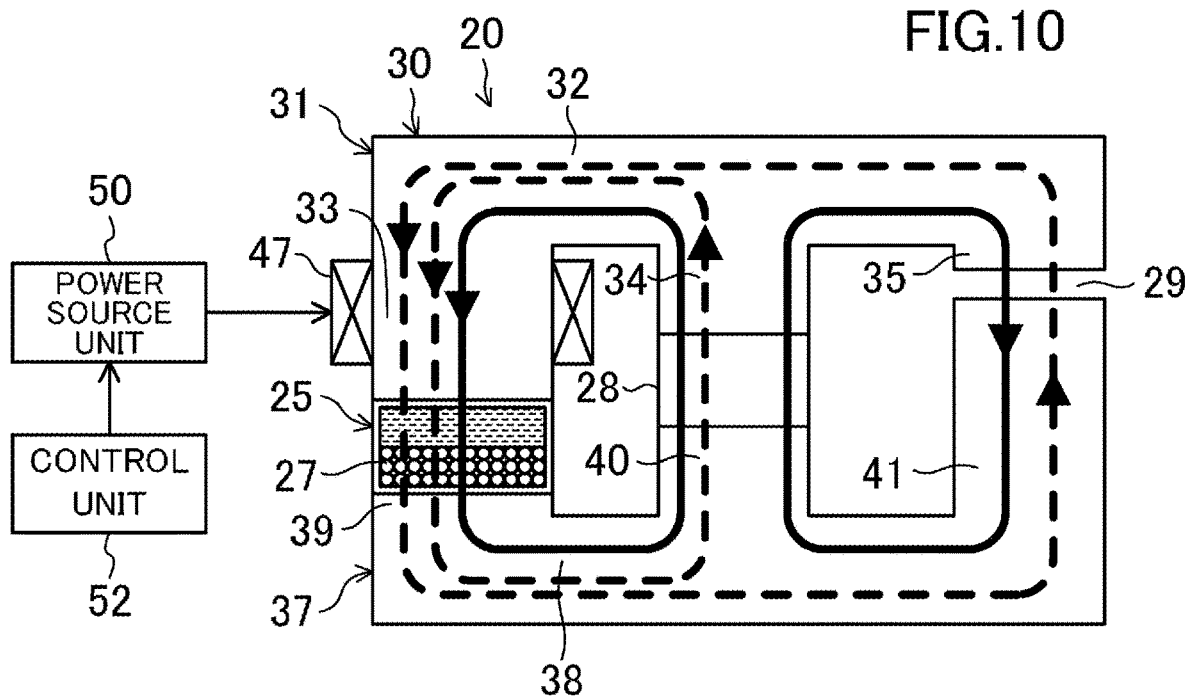
FIG. 10 is a view similar to FIG. 9, in which a positive current flows through the coil.
Figure 11:
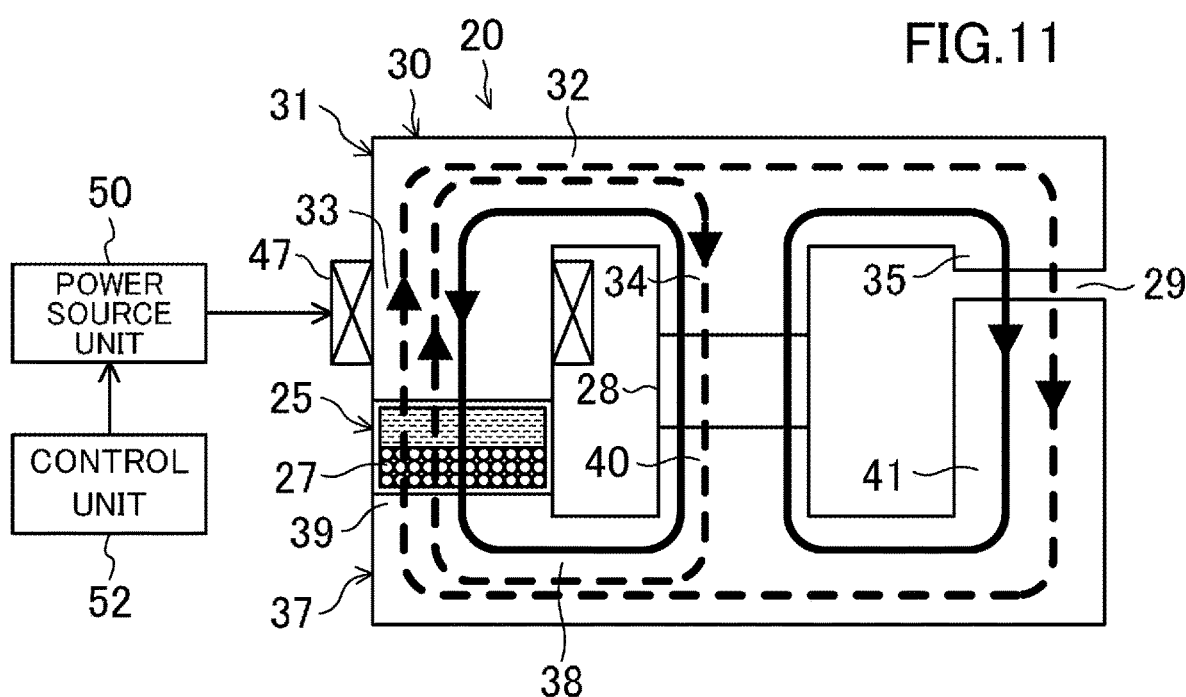
FIG. 11 is a view similar to FIG. 9, in which a negative current flows through the coil.

As shown in FIG. 9, the coil (47) is provided in the first closed magnetic circuit (44), more specifically, on the first upper arm portion (33). When a positive current (i.e., a current for generating a downward magnetic field in the coil (47)) flows through the coil (47), the magnetic field applied to the magnetic field application unit (25) is strengthened (see FIG. 10). When a negative current (i.e., a current for generating an upward magnetic field in the coil (47)) flows through the coil (47), the magnetic field applied to the magnetic field application unit (25) is weakened (see FIG. 11).

The magnetic field application device (20) is designed to satisfy $(k1+k2+k1\cdot k2)/(k1+K2)<\sqrt{2}$.

Also in the present variation, the same advantages as those of the first embodiment are obtained.

The magnetic field application device (20) of the present variation includes a first closed magnetic circuit (44) provided with the magnetic field application unit (25) and a second closed magnetic circuit (45) provided with the magnetic resistance portion (29), and the coil (47) is provided in the first closed magnetic circuit (44). Thus, the magnetic field application unit (25) and the coil (47) are provided in the first closed magnetic circuit (44), and the magnetic resistance portion (29) is provided in the second closed magnetic circuit (45). Therefore, when the current flows through the coil (47) in the direction in which the magnetic field applied to the magnetic working substance (27) is strengthened, the magnetic flux generated by the coil (47) coincides with the magnetization direction of the permanent magnet (28) in the permanent magnet (28). This raises the operating point of the permanent magnet (28), and increases the magnetic flux of the permanent magnet (28). As a result, the magnetic flux generated by the coil (47) can be reduced without reducing the magnetic field applied to the magnetic working substance (27), and the current flowing through the coil (47) can be reduced. Further, when the current flows through the coil (47) in the direction in which the magnetic field applied to the magnetic working substance (27) is weakened, the magnetic flux generated by the coil (47) does not coincide with the magnetization direction of the permanent magnet (28) in the permanent magnet (28). This lowers the operating point of the permanent magnet (28), and reduces the magnetic flux of the permanent magnet (28). Therefore, the magnetic flux generated by the coil (47) can be reduced without increasing the magnetic field to be applied to the magnetic working substance (27), and the current flowing through the coil (47) can be reduced.

The magnetic field application device (20) of the present variation is designed to satisfy $(k1+k2+k1\cdot k2)/(k1+K2)<\sqrt{2}$, where Ramr is a magnetic resistance of the magnetic field application unit (25), Rmag is a magnetic resistance of the permanent magnet (28), R1 is a magnetic resistance of the magnetic resistance portion (29), Rmag/Ramr=k1, and R1/Ramr=k2. Thus, when the magnetic working substance (27) causes the magnetocaloric effect of the same degree in both the presence and absence of the magnetic resistance portion (29), the copper loss in the coil (47) can be reduced in the presence of the magnetic resistance portion (29).

In the magnetic field application device (20) of the present variation, the closed magnetic circuits (44,45) include the first closed magnetic circuit (44) provided with the magnetic field application unit (25) and the coil (47), and the second closed magnetic circuit (45) provided with the magnetic resistance portion (29). The magnetic field application device (20) is configured to strengthen the magnetic field in the permanent magnet (28) when the current flows through the coil (47) in the direction in which the magnetic field applied to the magnetic working substance (27) is strengthened. Thus, when a large magnetic field is desired to be applied to the magnetic working substance (27), the magnetic flux generated by the coil (47) raises the operating point of the permanent magnet (28), and the magnetic flux of the permanent magnet (28) increases. This makes it possible to apply a larger magnetic field to the magnetic working substance (27) without increasing the magnetic flux generated by the coil (47).

Further, in the magnetic field application device (20) of the present variation, the closed magnetic circuits (44,45) include the first closed magnetic circuit (44) provided with the magnetic field application unit (25) and the coil (47), and the second closed magnetic circuit (45) provided with the magnetic resistance portion (29). The magnetic field application device (20) is configured to weaken the magnetic field in the permanent magnet (28) when the current flows through the coil (47) in the direction in which the magnetic field applied to the magnetic working substance (27) is weakened. Thus, when a small magnetic field is desired to be applied to the magnetic working substance (27), the magnetic flux generated by the coil (47) lowers the operating point of the permanent magnet (28), and the magnetic flux of the permanent magnet (28) decreases. This makes it possible to apply a smaller magnetic field to the magnetic working substance (27) without increasing the magnetic flux generated by the coil (47).

Second Embodiment

A second embodiment will be described below. A magnetic field application device (20) of the present embodiment is different from the magnetic field application device (25) of the first embodiment in that a plurality of magnetic field application units (25) is provided. Thus, differences from the first embodiment will be mainly described below.

Figure 12:
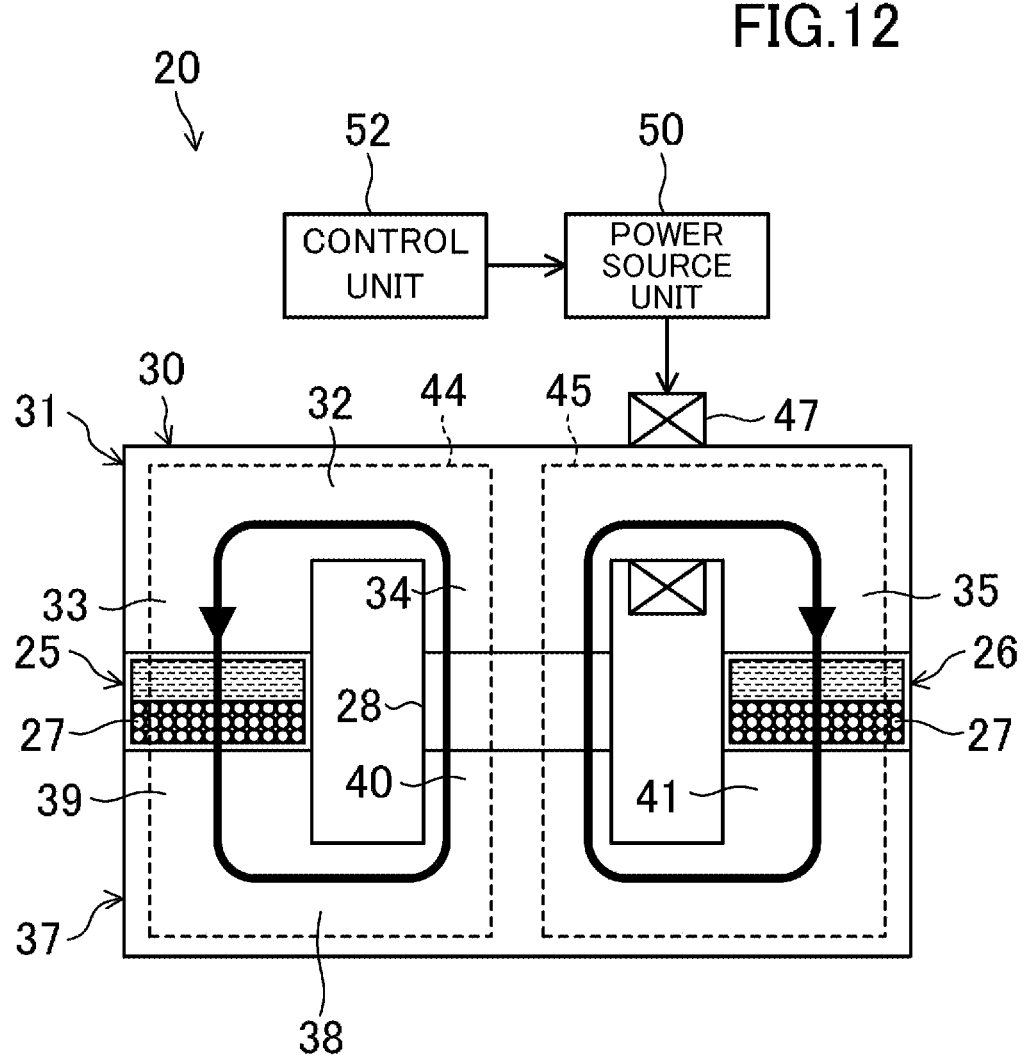
FIG. 12 is a front view schematically illustrating a configuration of a magnetic field application device according to a second embodiment, in which a coil is non-energized.

As shown in FIG. 12, the magnetic field application device (20) includes a first magnetic field application unit (25) and a second magnetic field application unit (26). The first magnetic field application unit (25) is provided in the first closed magnetic circuit (44). The second magnetic field application unit (26) is provided in the second closed magnetic circuit (45).

Figure 13:
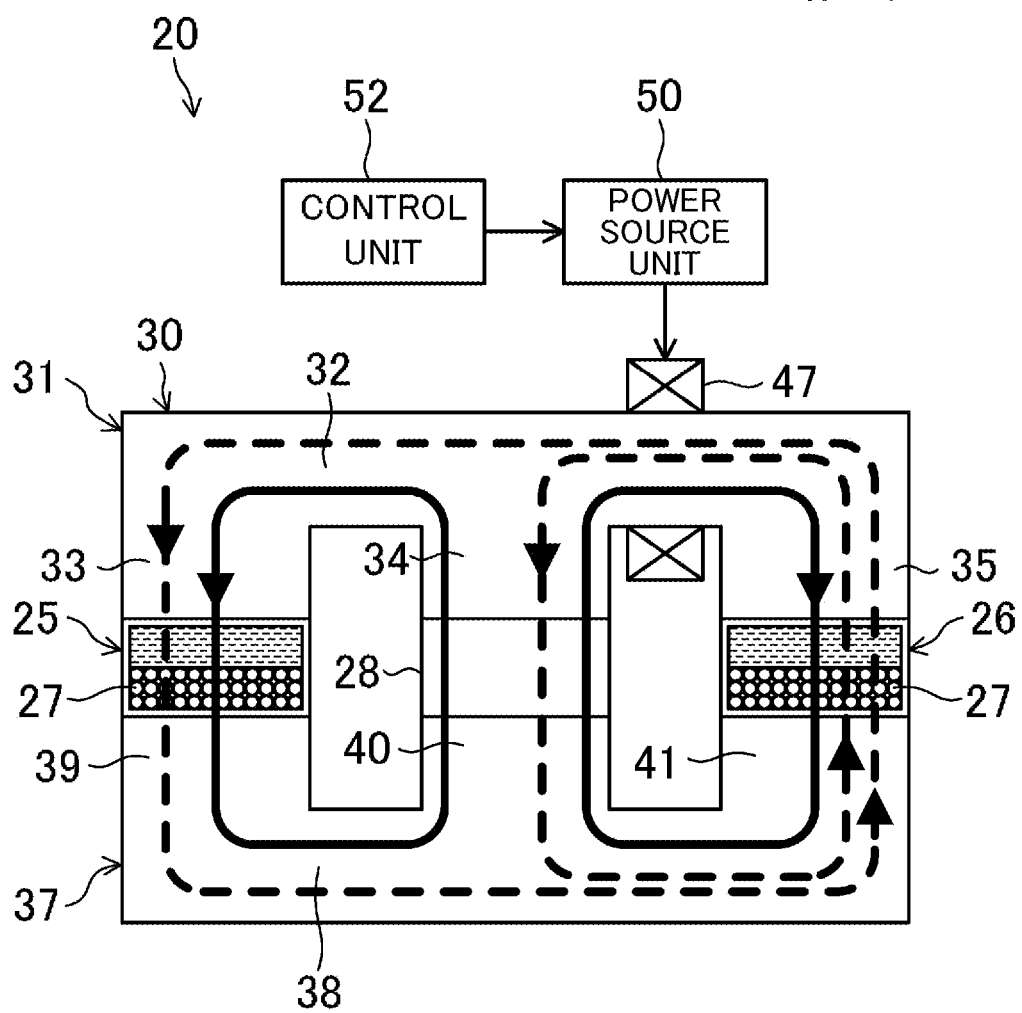
FIG. 13 is a view similar to FIG. 12, in which a first current flows through the coil.
Figure 14:
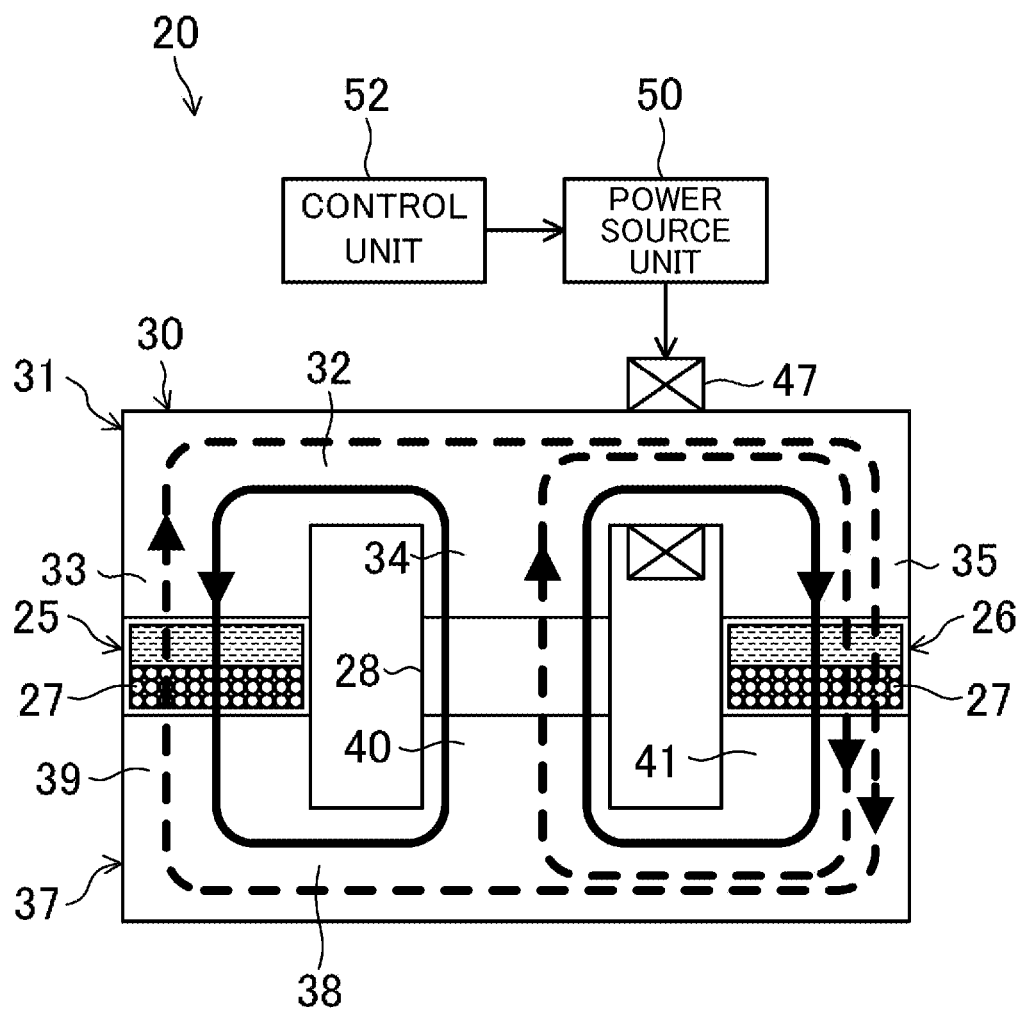
FIG. 14 is a view similar to FIG. 12, in which a second current flows through the coil.

The coil (47) is provided in the second closed magnetic circuit (45), more specifically, in the upper coupling portion (32) between the second upper arm portion (34) and the third upper arm portion (35). When a first current (i.e., a current for generating a leftward magnetic field in the coil (47)) flows through the coil (47), the magnetic field applied to the first magnetic field application unit (25) is strengthened, and the magnetic field applied to the second magnetic field application unit (26) is weakened (see FIG. 13). When a second current (i.e., a current for generating a rightward magnetic field in the coil (47)) flows through the coil (47), the magnetic field applied to the first magnetic field application unit (25) is weakened, and the magnetic field applied to the second magnetic field application unit (26) is strengthened (see FIG. 14). The coil (47) may be provided in the first closed magnetic circuit (44).

Advantages of Second Embodiment

Also in the present embodiment, the same advantages as those of the first embodiment can be obtained.

In the magnetic field application device (20) of the present embodiment, the magnetic field application unit includes a first magnetic field application unit (25) and a second magnetic field application unit (26). The closed magnetic circuits include a first closed magnetic circuit (44) provided with the first magnetic field application unit (25), and a second closed magnetic circuit (45) provided with the second magnetic field application unit (26). The coil (47) is provided in the second closed magnetic circuit (45). The magnetic field application device (20) further includes a control unit (52) that controls the current flowing through the coil (47) such that the current selectively flows in a direction in which the magnetic field applied to the magnetic working substance (27) of the first magnetic field application unit (25) is strengthened and the magnetic field applied to the magnetic working substance (27) of the second magnetic field application unit (26) is weakened, and a direction in which the magnetic field applied to the magnetic working substance (27) of the first magnetic field application unit (25) is weakened and the magnetic field applied to the magnetic working substance (27) of the second magnetic field application unit (26) is strengthened. Thus, the magnetic field application unit (25) is provided in each of the first closed magnetic circuit (44) and the second closed magnetic circuit (45). Control of the current flowing through the coil (47) can cause the first magnetic field application unit (25) and the second magnetic field application unit (26) to alternately generate and absorb heat. Specifically, when the first magnetic field application unit (25) generates heat, the second magnetic field application unit (26) absorbs heat, and when the first magnetic field application unit (25) absorbs heat, the second magnetic field application unit (26) generates heat. Thus, in the magnetic field application device (20) as a whole, heat generation and heat absorption occur at all times during the operation, and warm thermal energy and cold thermal energy can be continuously taken out. This can overcome the disadvantages of the magnetic field application device of Patent Document 1, i.e., the warm thermal energy and the cold thermal energy are taken out only discontinuously.

The magnetic field application device (20) of the present embodiment is configured such that when the current flows through the coil (47) in the direction in which the magnetic field applied to the magnetic working substance (27) of one of the first magnetic field application unit (25) or the second magnetic field application unit (26) is weakened, a magnetic field of the permanent magnet (28) is applied to the magnetic working substance (27) of the other one of the first magnetic field application unit (25) or the second magnetic field application unit (26). Thus, when the current flows through the coil (47) in the direction in which the magnetic field applied to the magnetic working substance (27) of the first magnetic field application unit (25) is weakened, a magnetic field applied by the current to the magnetic working substance (27) of the second magnetic field application unit (26) is strengthened, and the magnetic field of the permanent magnet (28) is applied to the magnetic working substance (27) of the second magnetic field application unit (26). On the other hand, when the current flows through the coil (47)

in the direction in which the magnetic field applied to the magnetic working substance (27) of the second magnetic field application unit (26) is weakened, a magnetic field applied by the current to the magnetic working substance (27) of the first magnetic field application unit (25) is strengthened, and the magnetic field of the permanent magnet (28) is applied to the magnetic working substance (27) of the first magnetic field application unit (25). Therefore, in the magnetic field application device (20) of the present embodiment, the magnetic field of the coil (47) and the magnetic field of the permanent magnet (28) can be superimposed to cause a great magnetocaloric effect.

In the magnetic field application device (20) of the present embodiment, the coil (47) is provided only in the second closed magnetic circuit (45) (or only in the first closed magnetic circuit (44)). Thus, both of the first magnetic field application unit (25) and the second magnetic field application unit (26) can cause the magnetocaloric effect even when the number of the coils (47) is reduced. This can reduce the cost of the magnetic field application device (20) and can increase the output.

Variation of Second Embodiment

A variation of the second embodiment will be described below. A magnetic field application device (20) of this variation differs from that of the second embodiment in that the permanent magnet (28) contains neodymium and contains no heavy rare earths, and that a plurality of coils (47, 48) and a plurality of power source units (50) are provided. Thus, differences from the second embodiment will be mainly described below.

Figure 15:
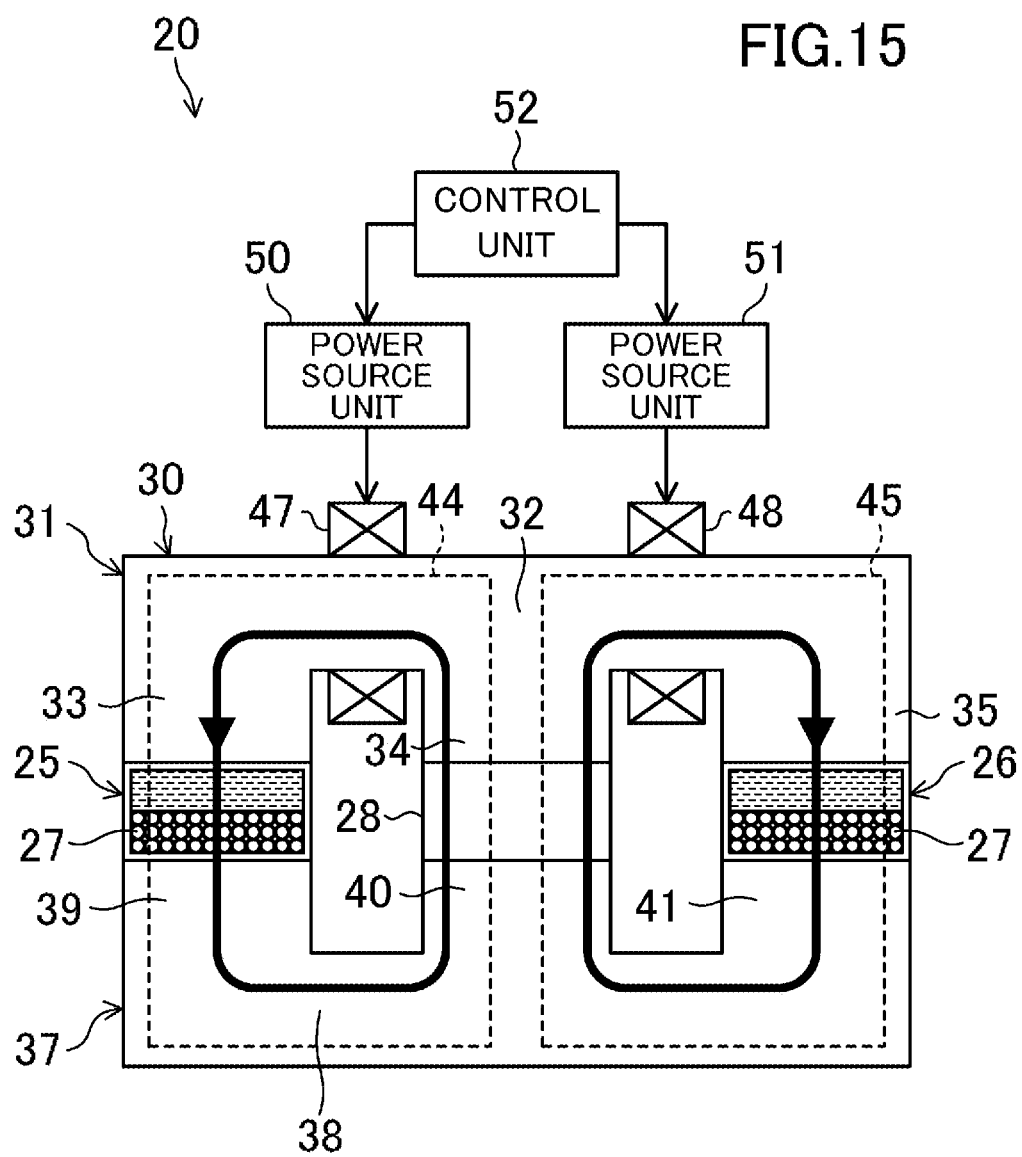
FIG. 15 is a front view schematically illustrating a configuration of a magnetic field application device according to a variation of the second embodiment, in which first and second coils are non-energized.

As shown in FIG. 15, the magnetic field application device (20) includes a first coil (47), a second coil (48), a first power source unit (50), and a second power source unit (51). The first coil (47) is provided in the first closed magnetic circuit (44). The second coil (48) is provided in the second closed magnetic circuit (45). The first power source unit (50) is connected to the first coil (47). The second power source unit (51) is connected to the second coil (48).

Figure 16:
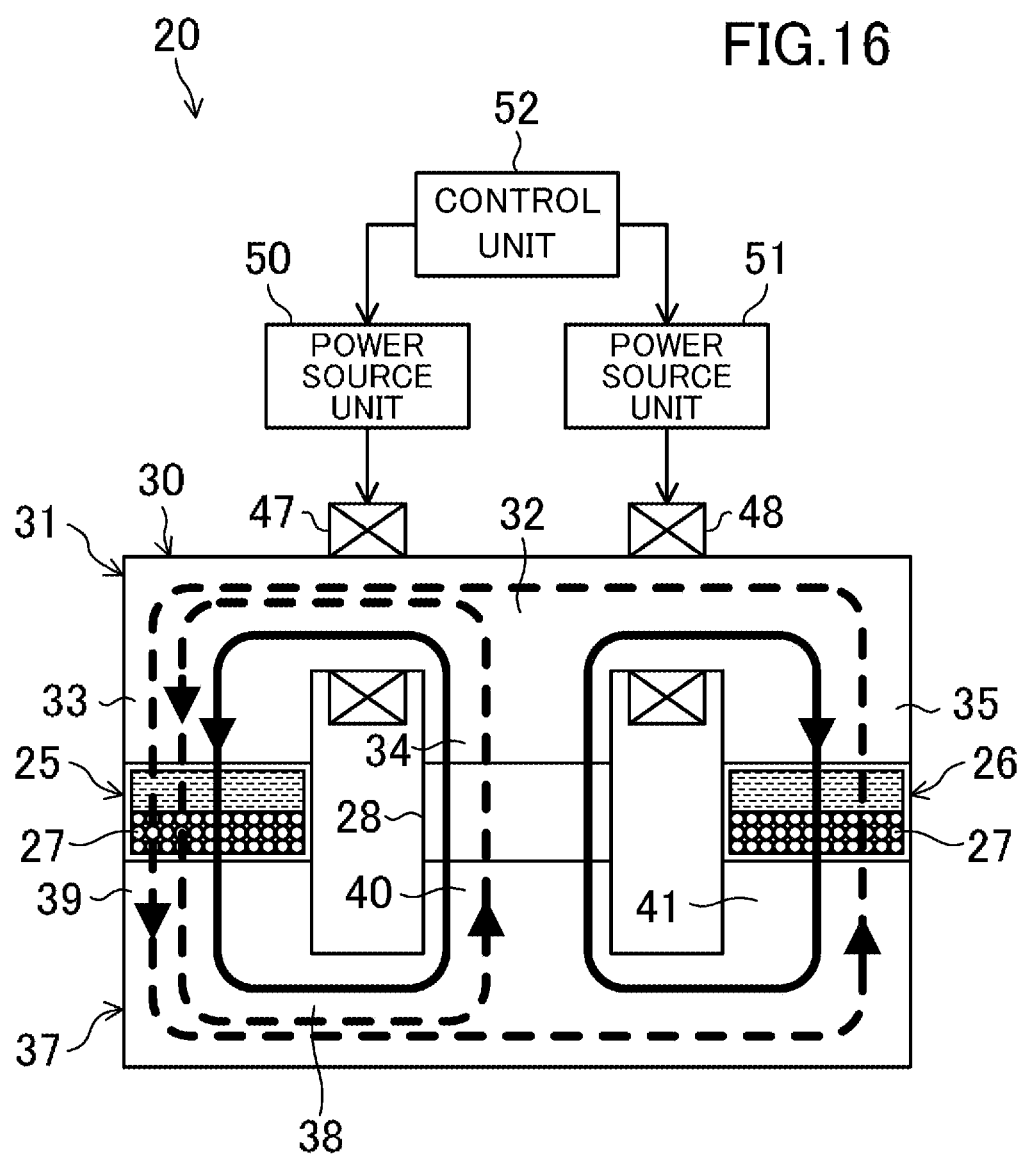
FIG. 16 is a view similar to FIG. 15, in which a positive current flows through the first coil only.
Figure 17:
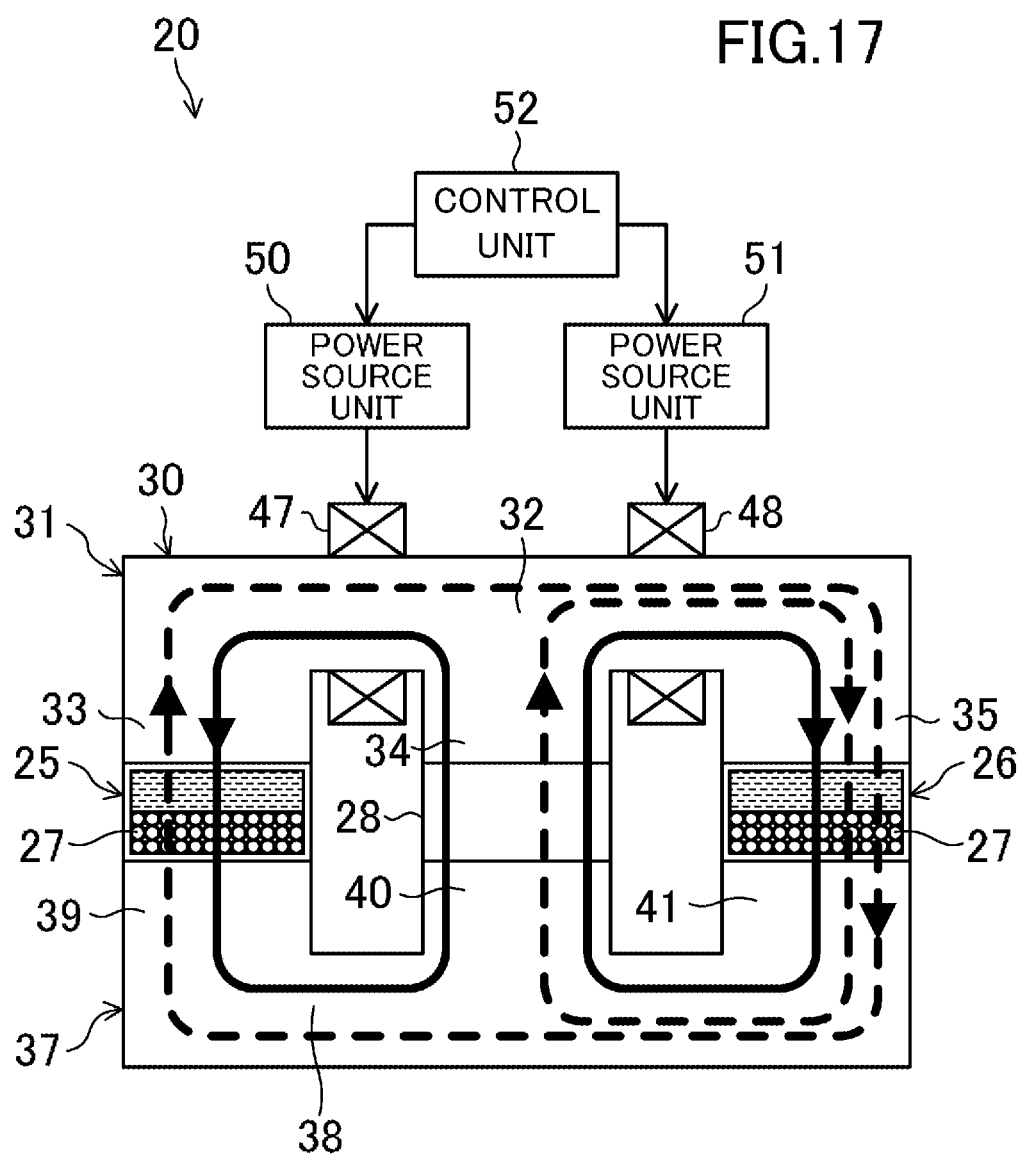
FIG. 17 is a view similar to FIG. 15, in which a positive current flows through the second coil only.

When a positive current (i.e., a current for generating a leftward magnetic field in the first coil (47)) flows through the first coil (47), the magnetic field applied to the first magnetic field application unit (25) is strengthened, and the magnetic field applied to the second magnetic field application unit (26) is weakened (see FIG. 16). When a positive current (i.e., a current for generating a rightward magnetic field in the second coil (48)) flows through the second coil (48), the magnetic field applied to the first magnetic field application unit (25) is weakened, and the magnetic field applied to the second magnetic field application unit (26) is strengthened (see FIG. 17).

Here, the magnetic flux density in the magnetic working substance (27) of the first magnetic field application unit (25) will be described below. Suppose that the magnetic working substance (27) of the first magnetic field application unit (25) has a magnetic flux density $B0\_1$ when the first and second coils (47, 48) are non-energized, and a magnetic flux density $Bmax\_1$ when the maximum positive current flows through the first coil (47). In this case, the magnetic field application device (20) is preferably configured to satisfy $0.1 \times Bmax\_1 \leq B0\_1 \leq 0.5 \times Bmax\_1$.

The magnetic flux density in the magnetic working substance (27) of the second magnetic field application unit (26) will be described below. Suppose that the magnetic working substance (27) of the second magnetic field application unit (26) has a magnetic flux density $B0\_2$ when the first and second coils (47, 48) are non-energized, and a magnetic flux density $Bmax\_2$ when the maximum positive current flows through the second coil (48). In this case, the magnetic field application device (20) is preferably configured to satisfy $0.1 \times Bmax\_2 \leq B0\_2 \leq 0.5 \times Bmax\_2$.

Also in the present variation, the same advantages as those of the second embodiment are obtained.

In the magnetic field application device (20) of the present variation, the coils (47, 48) are respectively provided in the first closed magnetic circuit (44) and the second closed magnetic circuit (45). Therefore, in both of the case where the magnetic field applied to the magnetic working substance (27) of the first magnetic field application unit (25) is strengthened by the first coil (47) provided in the first closed magnetic circuit (44) and the case where the magnetic field applied to the magnetic working substance (27) of the second magnetic field application unit (26) is strengthened by the second coil (48) provided in the second closed magnetic circuit (45), the magnetization direction of the magnetic flux generated by the coil (47, 48) coincides with that of the permanent magnet (28) in the permanent magnet (28). This raises the operating point of the permanent magnet (28) and increases the magnetic flux of the permanent magnet (28). As a result, a larger magnetic field can be applied to the magnetic working substance (27) without increasing the magnetic flux generated by the first and second coils (47, 48). Further, the magnetic flux generated by the first and second coils (47, 48) can be reduced without reducing the magnetic field applied to the magnetic working substance (27), and the current flowing through the first and second coils (47, 48) can be reduced. The magnetization direction of the magnetic flux generated by the coils (47, 48) has no difference from that of the permanent magnet (28) in the permanent magnet (28). Thus, the permanent magnet (28) is not irreversibly demagnetized by the magnetic flux generated by the coils (47, 48), and the addition of heavy rare earths for the purpose of improving the demagnetization resistance is no longer necessary. Therefore, the permanent magnet (28) containing neodymium but contains no heavy rare earths can be used.

Third Embodiment

A third embodiment will be described below. A magnetic field application device (20) of the present embodiment is different from that of the first embodiment in the configuration of the yoke (30), the number of magnetic field application units (25), and the number and arrangement of the coils (47, 48). Thus, differences from the first embodiment will be mainly described below.

Figure 18:
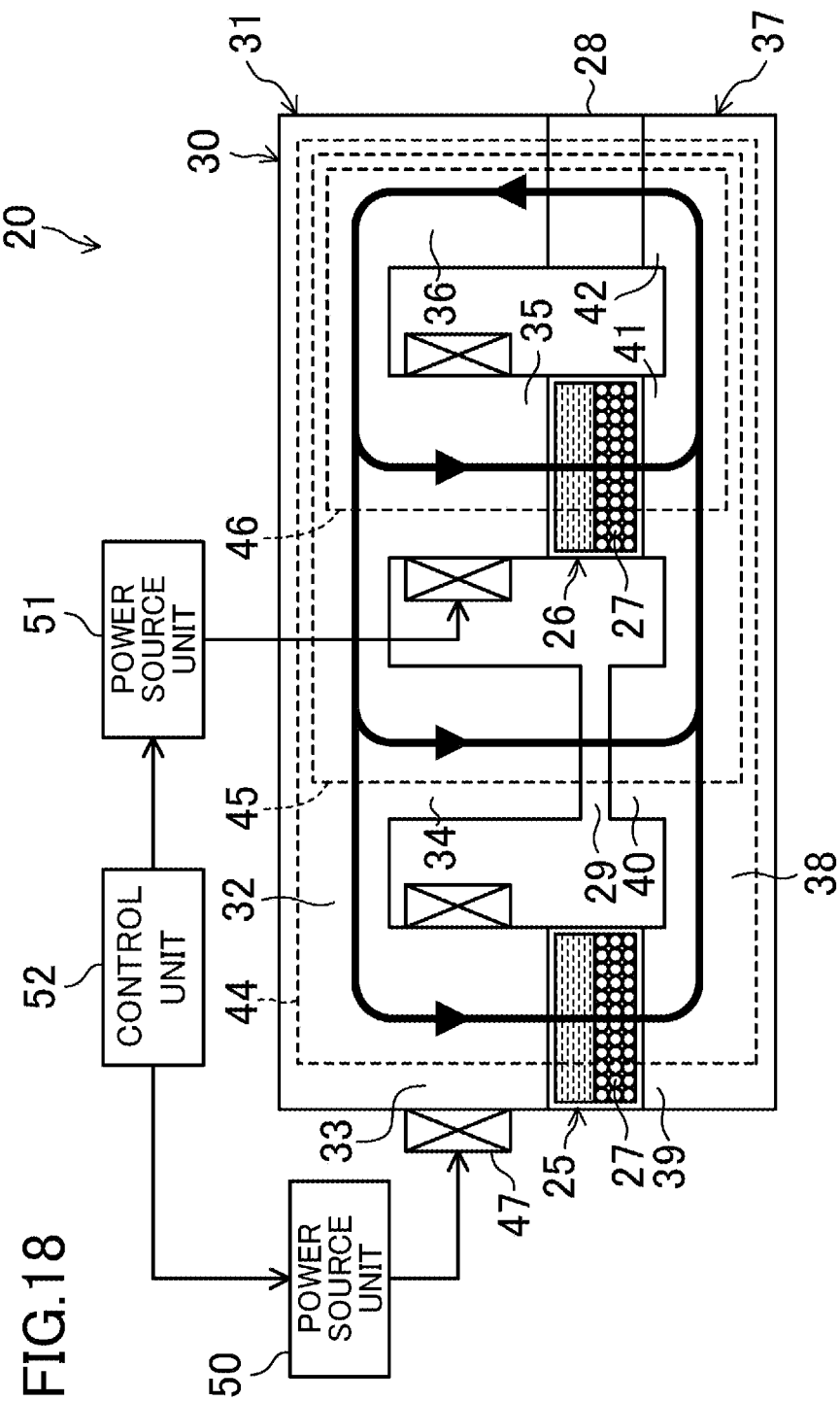
FIG. 18 is a front view schematically illustrating a configuration of a magnetic field application device according to a third embodiment, in which first and second coils are non-energized.
Figure 19:
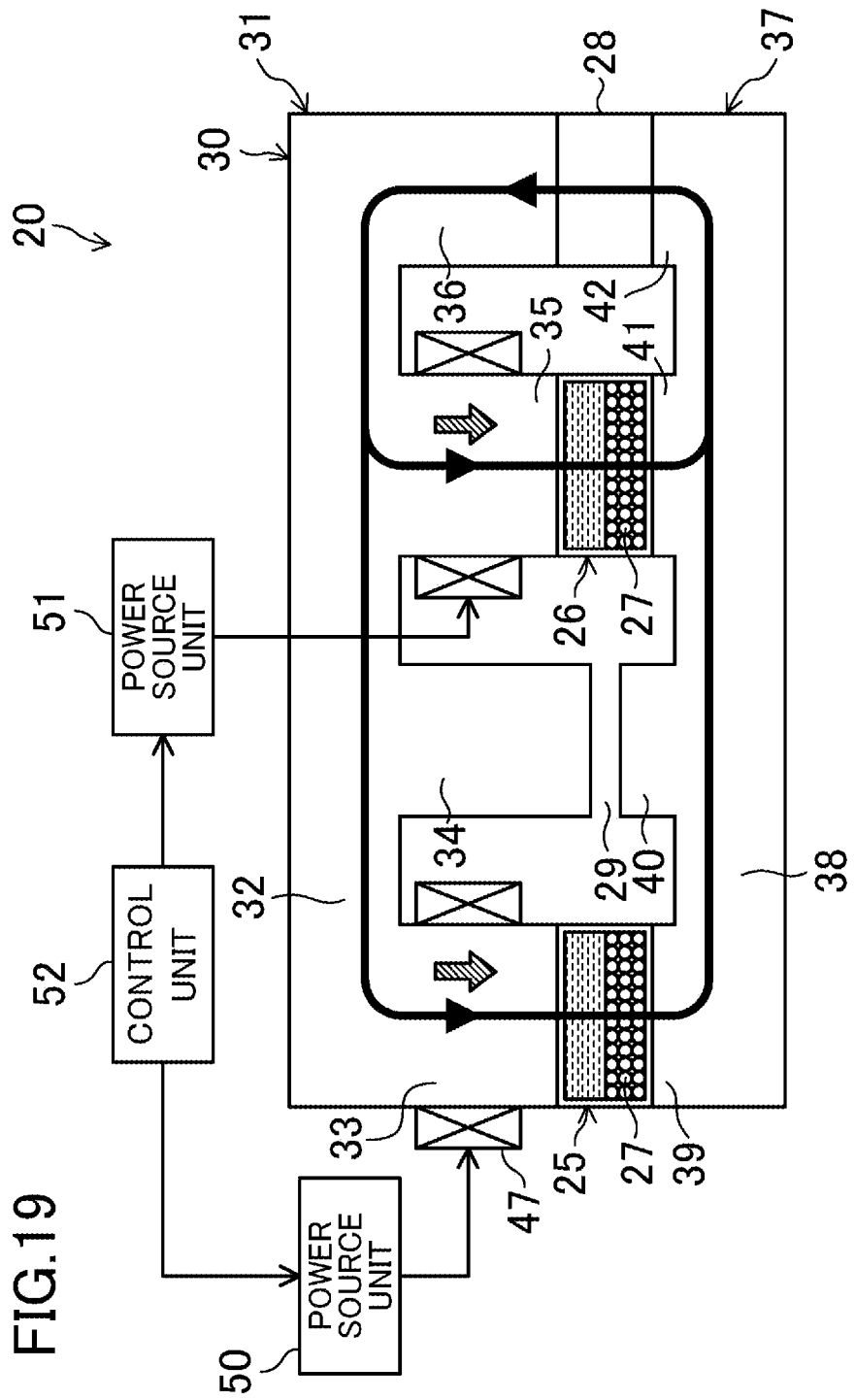
FIG. 19 is a view similar to FIG. 18, in which a positive current flows through the first and second coils.
Figure 20:
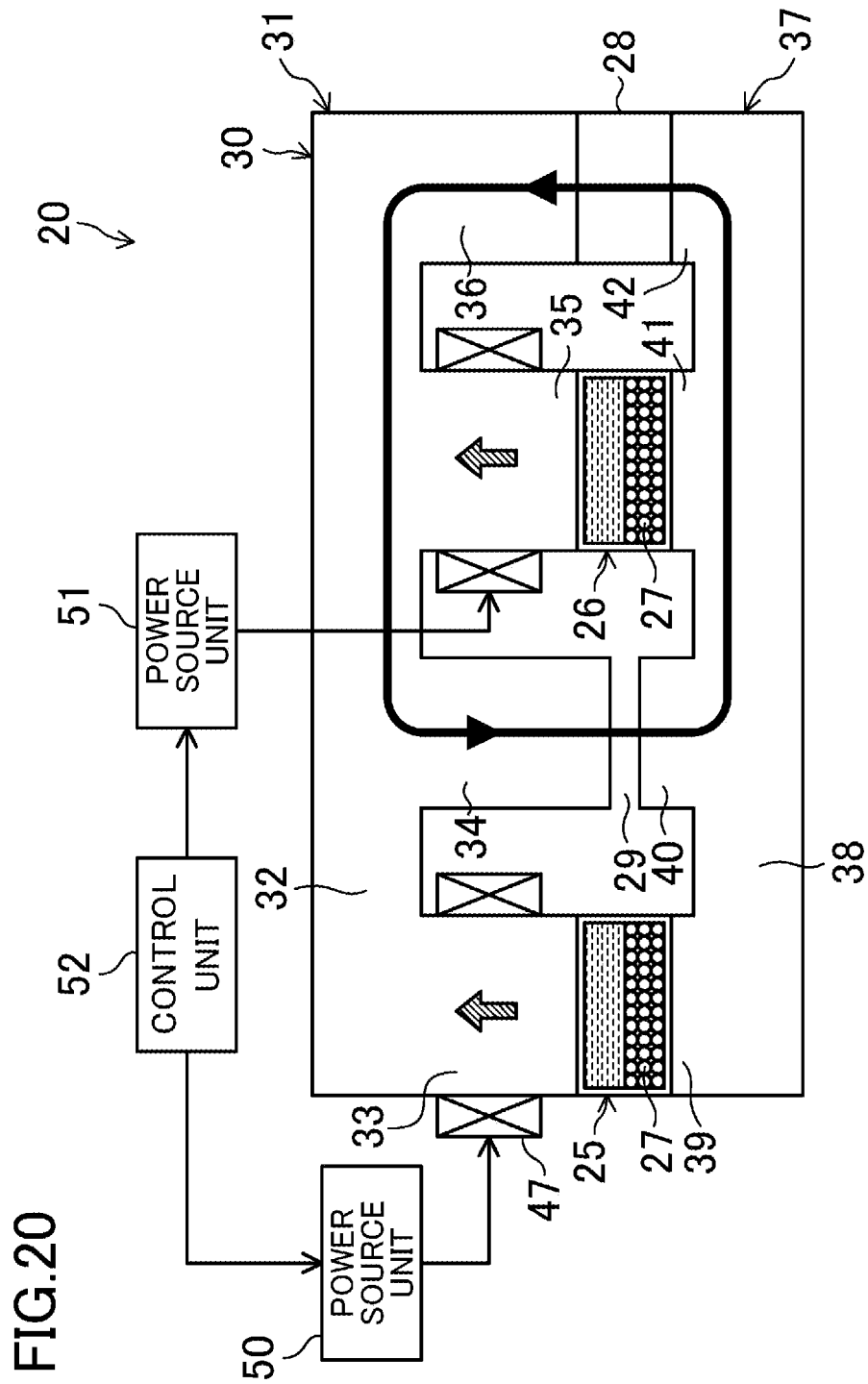
FIG. 20 is a view similar to FIG. 18, in which a negative current flows through the first and second coils.
Figure 21:
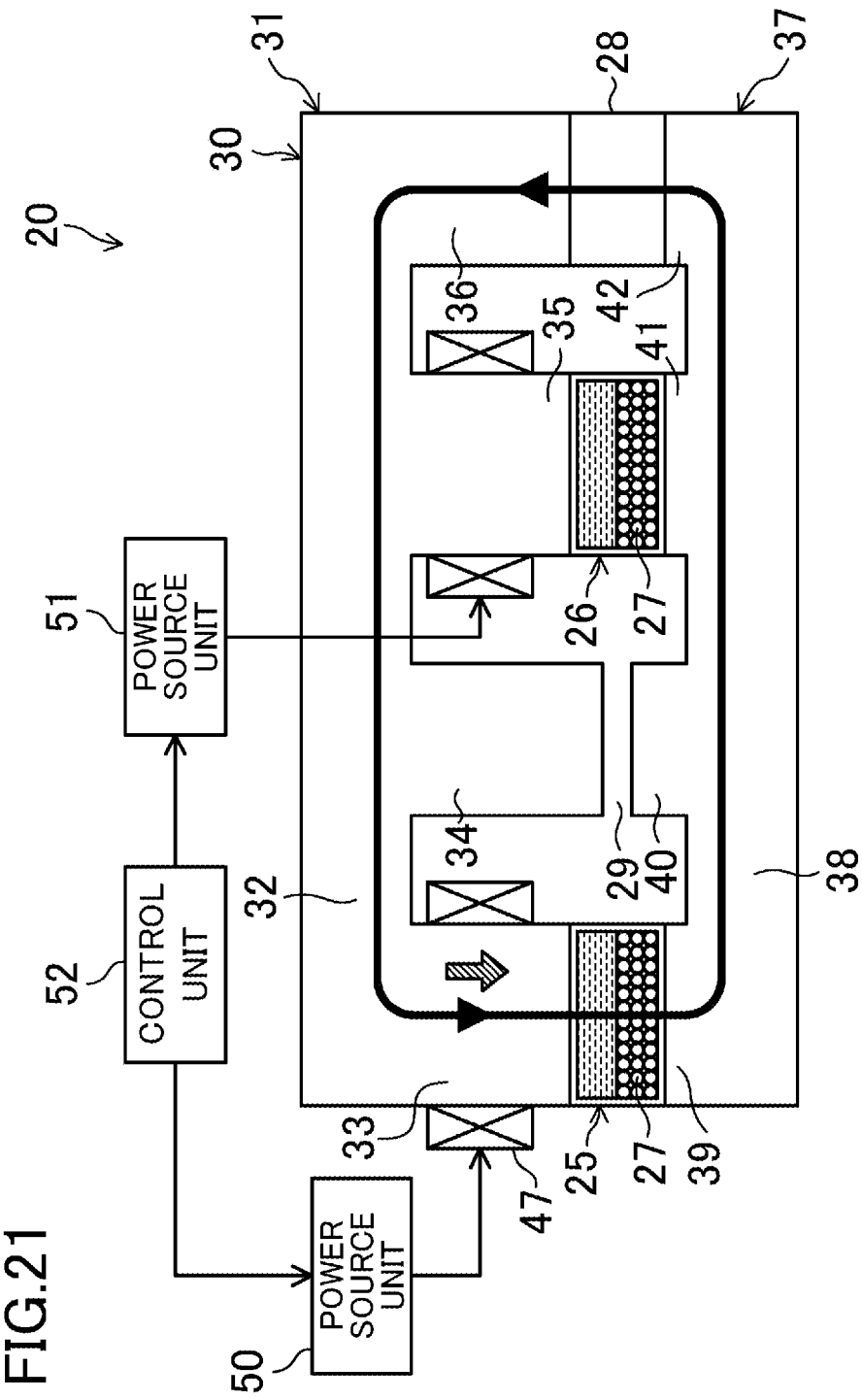
FIG. 21 is a view similar to FIG. 18, in which a positive current flows through the first coil only.

As shown in FIG. 18, the magnetic field application device (20) includes a first magnetic field application unit (25), a second magnetic field application unit (26), a first coil (47), a second coil (48), a first power source unit (50), and a second power source unit (51). The yoke (30) of the present embodiment has a different configuration from the yoke (30) of the first embodiment. In FIG. 18, solid line arrows indicate a magnetic field generated by the permanent magnet (28). In FIGS. 19 to 21, solid line arrows indicate a composite of the magnetic field generated by the permanent magnet (28) and a magnetic field generated by each coil (47, 48), and thick arrows indicate the direction of the magnetic field generated by each coil (47, 48).

The yoke (30) includes a first yoke member (31) and a second yoke member (37). The first yoke member (31) and the second yoke member (37) are made of a magnetic material.

The first yoke member (31) has an upper coupling portion (32) extending to the left and the right in FIG. 18, a first upper arm portion (33) that protrudes downward from one end (left end in FIG. 18) of the upper coupling portion (32), a second upper arm portion (34) that protrudes downward from a position slightly leftward of the center of the upper coupling portion (32), a third upper arm portion (35) that protrudes downward from a position slightly rightward of the center of the upper coupling portion (32), and a fourth upper arm portion (36) that protrudes downward from the other end (right end in FIG. 18) of the upper coupling portion (32).

The second yoke member (37) has a lower coupling portion (38) extending to the left and the right in FIG. 18, a first lower arm portion (39) that protrudes upward from one end (left end in FIG. 18) of the lower coupling portion (38), a second lower arm portion (40) that protrudes upward from a position slightly leftward of the center of the lower coupling portion (38), a third lower arm portion (41) that protrudes upward from a position slightly rightward of the center of the lower coupling portion (38), and a fourth lower arm portion (42) that protrudes upward from the other end (right end in FIG. 18) of the lower coupling portion (38).

The first magnetic field application unit (25) is supported between the first upper arm portion (33) and the first lower arm portion (39). An air gap is formed as the magnetic resistance portion (29) between the second upper arm portion (34) and the second lower arm portion (40). The second magnetic field application unit (26) is supported between the third upper arm portion (35) and the third lower arm portion (41). The permanent magnet (28) is supported between the fourth upper arm portion (36) and the fourth lower arm portion (42).

The yoke (30) forms a first closed magnetic circuit (44) which is a closed circuit that magnetically connects the first magnetic field application unit (25) and the permanent magnet (28) in series via the first upper arm portion (33), the upper coupling portion (32), the fourth upper arm portion (36), the fourth lower arm portion (42), the lower coupling portion (38), and the first lower arm portion (39). The yoke (30) also forms a second closed magnetic circuit (45) which is a closed circuit that magnetically connects the permanent magnet (28) and the air gap as the magnetic resistance portion (29) in series via the second upper arm portion (34), the upper coupling portion (32), the fourth upper arm portion (36), the fourth lower arm portion (42), the lower coupling portion (38), and the second lower arm portion (40). The yoke (30) forms a third closed magnetic circuit (46) which is a closed circuit that magnetically connects the second magnetic field application unit (26) and the permanent magnet (28) in series via the third upper arm portion (35), the upper coupling portion (32), the fourth upper arm portion (36), the fourth lower arm portion (42), the lower coupling portion (38), and the third lower arm portion (41).

In other words, the yoke (30) forms the first closed magnetic circuit (44), the second closed magnetic circuit (45), and the third closed magnetic circuit (46) each of which is a closed circuit that magnetically connects both ends in the magnetization direction of the permanent magnet (28). The first closed magnetic circuit (44) is provided with the first magnetic field application unit (25). The second closed magnetic circuit (45) is provided with the air gap as the magnetic resistance portion (29). The third closed magnetic circuit (46) is provided with the second magnetic field application unit (26).

The first coil (47) is provided in the first closed magnetic circuit (44), more specifically, on the first upper arm portion (33). The second coil (48) is provided in the third closed magnetic circuit (46), more specifically, on the third upper arm portion (35). When a positive current (i.e., a current for generating a downward magnetic field in the first and second coils (47, 48)) flows through the first and second coils (47, 48), the magnetic field applied to the first and second magnetic field application units (25, 26) is strengthened (see FIG. 19). When a negative current (i.e., a current for generating an upward magnetic field in the first and second coils (47, 48)) flows through the first and second coils (47, 48), the magnetic field applied to the first and second magnetic field application units (25, 26) is weakened (see FIG. 20). As shown in FIGS. 19 and 20, the directions of the magnetic fields generated by the coils (47, 48) may be indicated by thick arrows in respective drawings.

The first power source unit (50) is connected to the first coil (47), and the second power source unit (51) is connected to the second coil (48).

As described above, the control unit (52) is configured to control the first and second power source units (50, 51) so that the positive or negative current flows through both of the first and second coils (47, 48) as described above, and to control the first and second power source units (50, 51) so that the state shown in FIG. 20 and the state shown in FIG. 21 are alternately repeated. Specifically, when the device is alternately switched between the state in which the negative current flows through both of the first and second coils (47, 48) (the state shown in FIG. 20) and the state in which the positive current flows only through the first coil (47) and in which the second coil (48) is non-energized (the state shown in FIG. 21), the first magnetic field application unit (25) can cause the magnetocaloric effect, while the second magnetic field application unit (26) is substantially blocked from causing the magnetocaloric effect.

Advantages of Third Embodiment

Also in the present embodiment, the same advantages as those of the first embodiment can be obtained.

In the magnetic field application device (20) of the present embodiment, the magnetic field application unit includes the first magnetic field application unit (25) and the second magnetic field application unit (26); the coil includes the first coil (47) and the second coil (48); and the closed magnetic circuits include the first closed magnetic circuit (44) provided with the first magnetic field application unit (25) and the first coil (47), the second closed magnetic circuit (45) provided with the second magnetic field application unit (26) and the second coil (48), and the third closed magnetic circuit (46) provided with the magnetic resistance portion (29). The magnetic field application device (20) is configured such that a magnetic flux of the permanent magnet (28) is branched to flow through the first closed magnetic circuit (44), the second closed magnetic circuit (45), and the third closed magnetic circuit (46) when the first coil (47) and the second coil (48) are non-energized. The magnetic field application device (20) further includes the control unit (52) that controls the current flowing through the first coil (47) such that the current selectively flows in the directions in which the magnetic field applied to the magnetic working substance (27) of the first magnetic field application unit (25) is strengthened and weakened, and controls the current flowing through the second coil (48) such that the current selectively flows in the directions in which the magnetic field applied to the magnetic working substance (27) of the second magnetic field application unit (26) is strengthened and weakened. Thus, the magnetic field application device (20) is provided with two coils (47, 48) and two magnetic field application units (25, 26). Thus, the output of the magnetic field application device (20) can be made higher than that of the magnetic field application device provided with only a single magnetic field application unit (25). The two magnetic field application units (25, 26) can be operated by a single magnetic circuit, which can downsize the magnetic field application device (20) as compared to the case where, for example, a single magnetic circuit is provided for a single magnetic field application unit (25).

The magnetic field application device (20) is configured to: increase the magnetic flux of the permanent magnet (28) flowing through at least one of the second closed magnetic circuit (45) or the third closed magnetic circuit (46) when the current flows through the first coil (47) in the direction in which the magnetic field applied to the magnetic working substance (27) of the first magnetic field application unit (25) is weakened; and increase the magnetic flux of the permanent magnet (28) flowing through at least one of the first closed magnetic circuit (44) or the third closed magnetic circuit (46) when the current flows through the second coil (48) in the direction in which the magnetic field applied to the magnetic working substance (27) of the second magnetic field application unit (26) is weakened. Thus, when the current flows in the direction in which the magnetic field applied to the magnetic working substance (27) corresponding to the first coil (47) or the second coil (48) is weakened, the magnetic flux of the permanent magnet (28) flowing through the closed magnetic circuit (44, 46) having no coil (47, 48) increases. This means that the magnetic flux of the permanent magnet (28) flowing through the closed magnetic circuit (44, 46) in which the magnetic field applied to the magnetic working substance (27) is desired to be weakened decreases. Thus, for example, when removal of the magnetic field from the magnetic working substance (27) is required, the permanent magnet (28) can be blocked from interfering with the removal.

In the magnetic field application device (20) of the present embodiment, the control unit (52) is configured to: control the current flowing through the first coil (47) such that the current flows in the direction in which the magnetic field applied to the magnetic working substance (27) of the first magnetic field application unit (25) is strengthened by allowing the current flowing through the second coil (48) to flow in the direction in which the magnetic field applied to the magnetic working substance (27) of the second magnetic field application unit (26) is strengthened; and control the current flowing through the first coil (47) such that the current flows in the direction in which the magnetic field applied to the magnetic working substance (27) of the first magnetic field application unit (25) is weakened by allowing the current flowing through the second coil (48) to flow in the direction in which the magnetic field applied to the magnetic working substance (27) of the second magnetic field application unit (26) is weakened. Thus, both of the magnetic working substance (27) of the first magnetic field application unit (25) and the magnetic working substance (27) of the second magnetic field application unit (26) simultaneously generate or absorb heat. This can increase the maximum output of the magnetic field application device (20). As an example, when the magnetic working substances (27) of the first and second magnetic field application units (25, 26) have different Curie temperatures Tc, and are arranged in series with respect to a heating medium circuit (11), a temperature difference caused by the magnetic field application device (20) can be increased. As another example, when the magnetic working substances (27) of the first and second magnetic field application units (25, 26) have the same Curie temperature Tc, and are arranged in parallel with respect to the heating medium circuit (11), an air-conditioning system (10) can improve in refrigerating capacity.

In the magnetic field application device (20) of the present embodiment, the control unit (52) is configured to: control the current flowing through the first coil (47) such that the current selectively flows in the directions in which the magnetic field applied to the magnetic working substance (27) of the first magnetic field application unit (25) is strengthened and weakened; and control the current flowing through the second coil (48) such that the magnetic field applied to the magnetic working substance (27) of the second magnetic field application unit (26) is kept constant. Thus, the first magnetic field application unit (25) causes the magnetocaloric effect, while the second magnetic field application unit (26) causes substantially no magnetocaloric effect. This can operate the magnetic field application device (20) while reducing the output of the magnetic field application device (20). As an example, when the magnetic working substances (27) of the first and second magnetic field application units (25, 26) have different Curie temperatures Tc, a temperature difference caused by the magnetic field application device (20) can be changed. As another example, when the magnetic working substances (27) of the first and second magnetic field application units (25, 26) have the same Curie temperature Tc, the refrigerating capacity of the air-conditioning system (10) can be reduced.

First Variation of Third Embodiment

Figure 22:
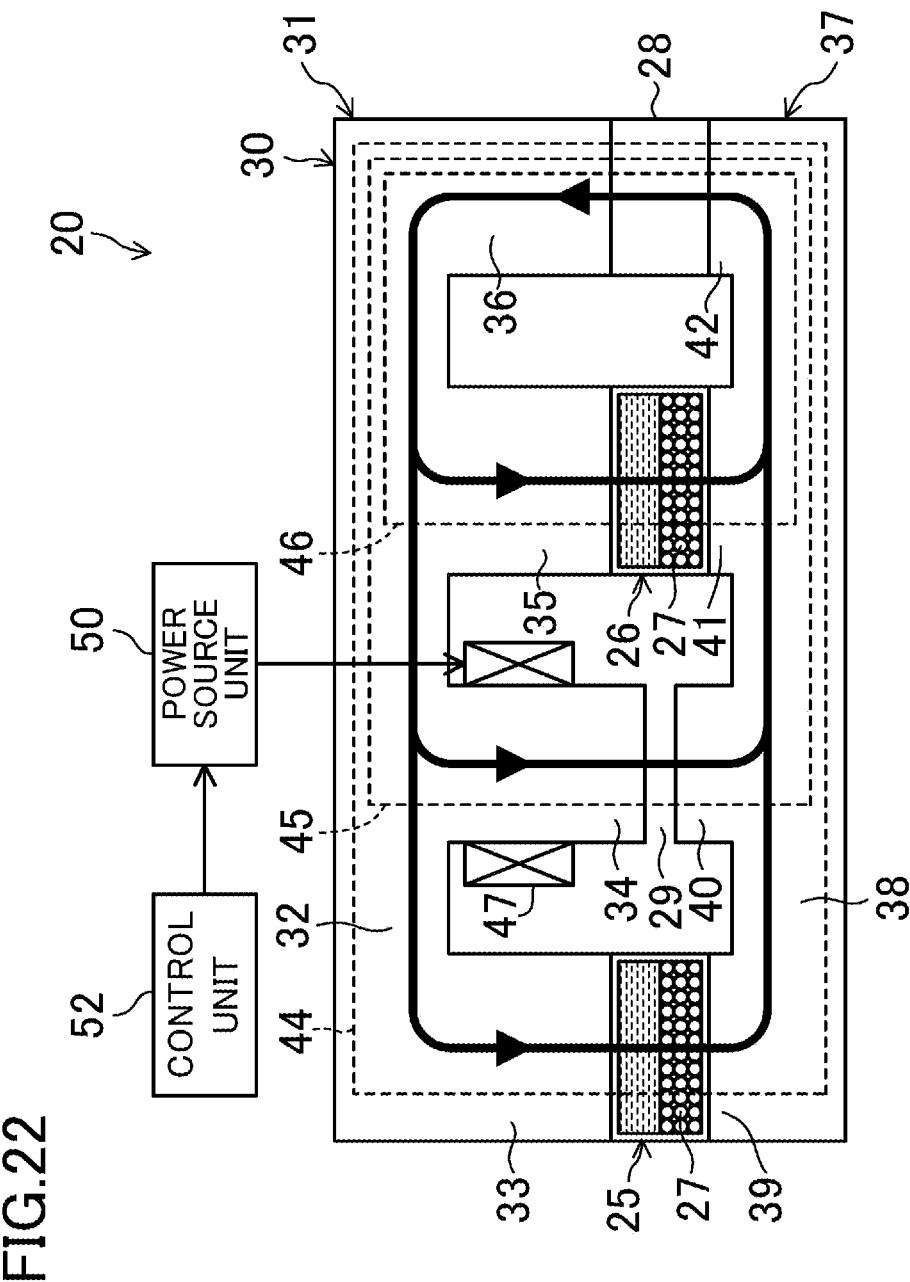
FIG. 22 is a front view schematically illustrating a configuration of a magnetic field application device according to a first variation of the third embodiment, in which a coil is non-energized.
Figure 23:
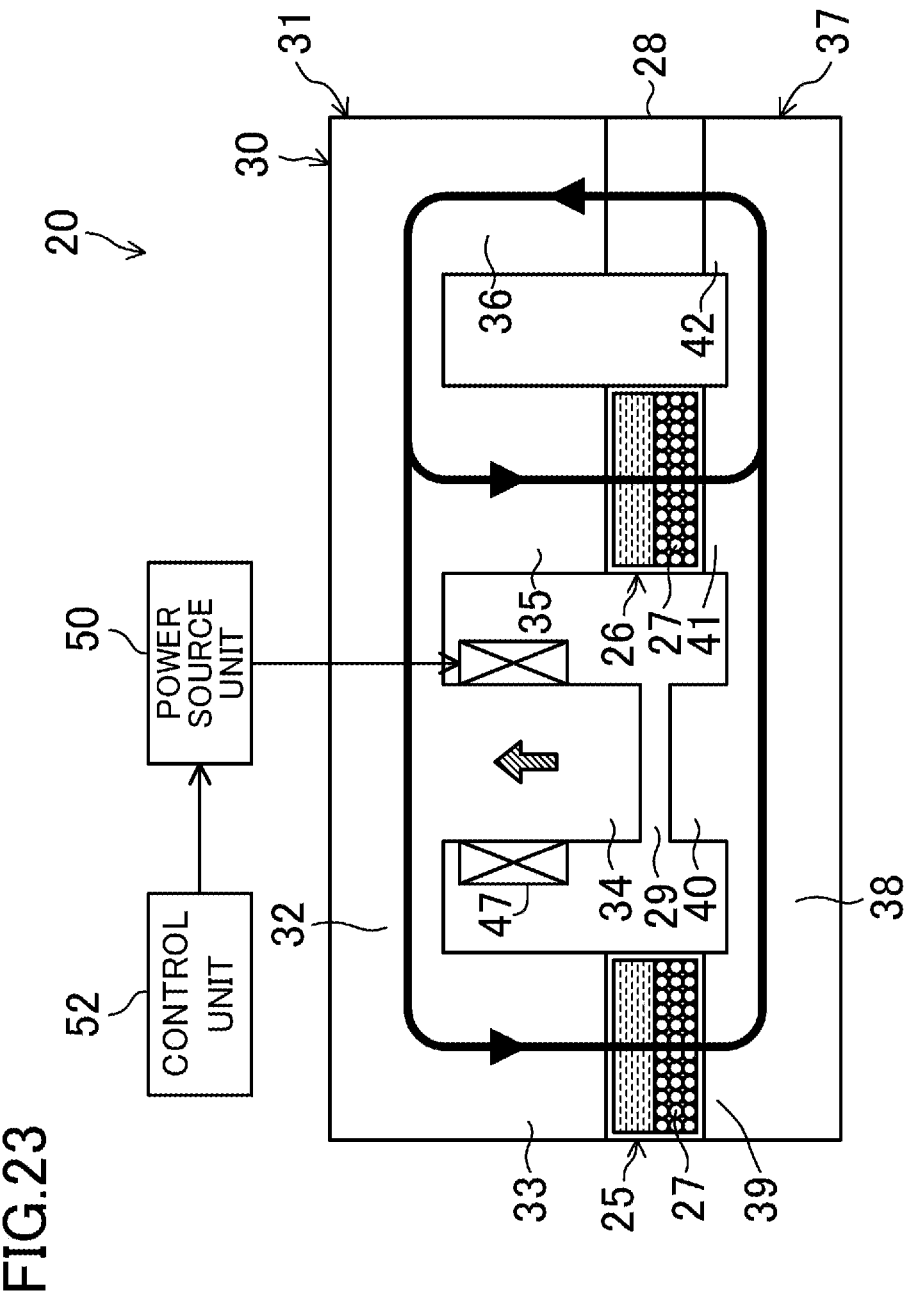
FIG. 23 is a view similar to FIG. 22, in which a positive current flows through the coil.
Figure 24:
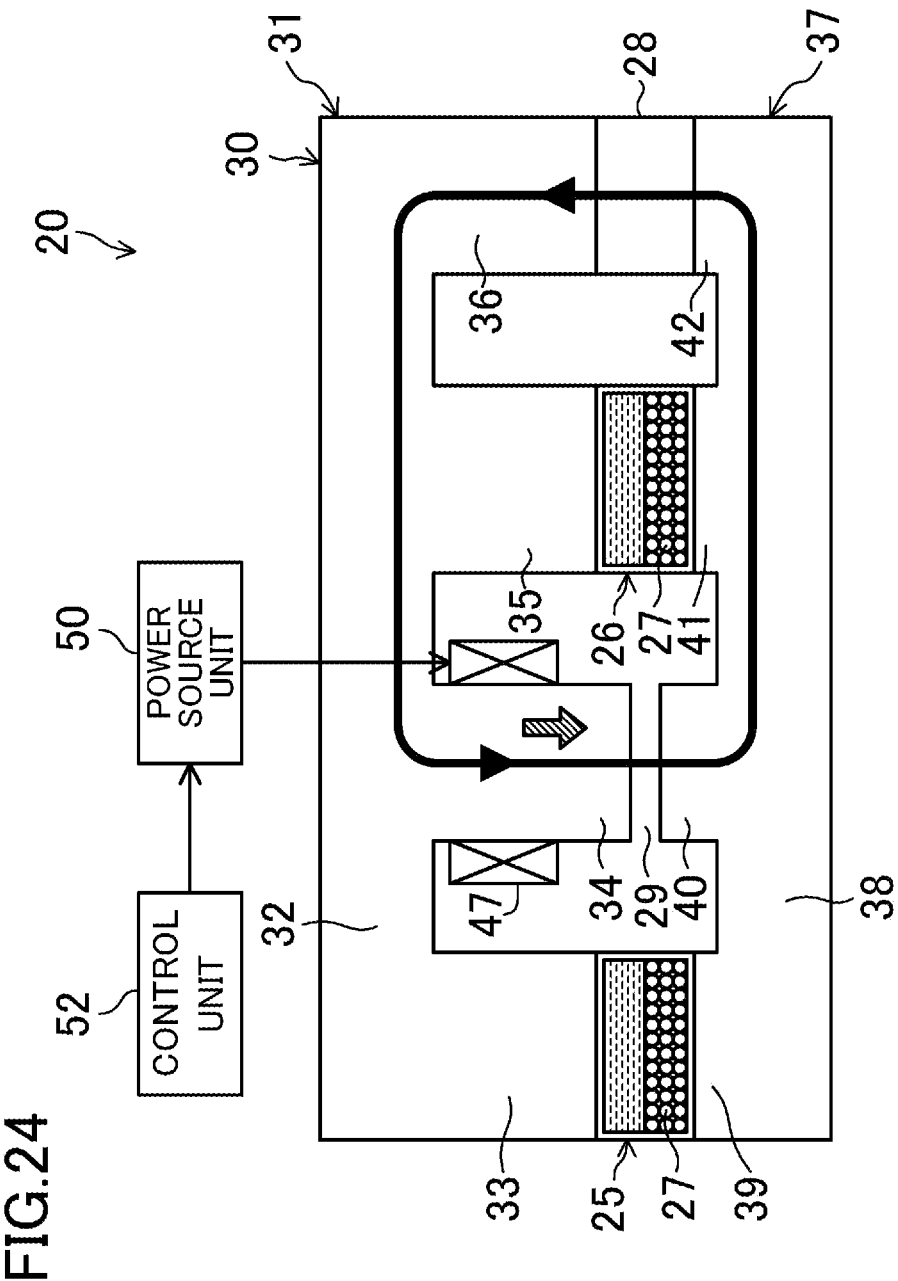
FIG. 24 is a view similar to FIG. 22, in which a negative current flows through the coil.

A first variation of the third embodiment will be described below. A magnetic field application device (20) according to this variation is different from that of the third embodiment in the number and arrangement of coils (47). Thus, differences from the third embodiment will be mainly described below. In FIG. 22, solid line arrows indicate a magnetic field generated by the permanent magnet (28). In FIGS. 23 and 24, solid line arrows indicate a composite of the magnetic field generated by the permanent magnet (28) and a magnetic field generated by the coil (47), and a thick arrow indicates the direction of the magnetic field generated by the coil (47).

As shown in FIG. 22, the magnetic field application device (20) includes only a single coil (47). The coil (47) is provided in the second closed magnetic circuit (45), more specifically, on the second upper arm portion (34). When a positive current (i.e., a current for generating an upward magnetic field in the coil (47)) flows through the coil (47), the magnetic field applied to the first and second magnetic field application units (25, 26) is strengthened (see FIG. 23). When a negative current (i.e., a current for generating a downward magnetic field in the coil (47)) flows through the coil (47), the magnetic field applied to the first and second magnetic field application units (25, 26) is weakened (see FIG. 24).

Also in the present variation, the same advantages as those of the third embodiment are obtained.

In the magnetic field application device (20) of the present variation, the magnetic field application unit includes the first magnetic field application unit (25) and the second magnetic field application unit (26); and the closed magnetic circuits include the first closed magnetic circuit (44) provided with the first magnetic field application unit (25), the second closed magnetic circuit (45) provided with the second magnetic field application unit (26), and the third closed magnetic circuit (46) provided with the magnetic resistance portion (29) and the coil (47). The magnetic field application device (20) is configured such that a magnetic flux of the permanent magnet (28) is branched to flow through the first closed magnetic circuit (44), the second closed magnetic circuit (45), and the third closed magnetic circuit (46) when the coil (47) is non-energized. The magnetic field application device (20) further includes the control unit (52) that controls the current flowing through the coil (47) such that the current selectively flows in the directions in which the magnetic field applied to the magnetic working substances (27) of the first and second magnetic field application units (25, 26) is strengthened and weakened. Thus, the coil (47) provided in the third closed magnetic circuit (46) allows both of the first magnetic field application unit (25) and the second magnetic field application unit (26) to cause the magnetocaloric effect, which can increase the output of the magnetic field application device (20). Since a single magnetic circuit is provided for the two magnetic field application units (25), the magnetic field application device (20) can be downsized. Further, having the coil (47) provided only for the third closed magnetic circuit (46), the magnetic field application device (20) can be simplified. As described above, according to the present variation, the high-output, small-sized, and simple magnetic field application device (20) can be provided.

Second Variation of Third Embodiment

A second variation of the third embodiment will be described below. A magnetic field application device (20) of this variation differs from that of the first variation of the third embodiment in that an auxiliary coil (49) is provided and a plurality of power source units (50) are provided. Thus, differences from the first variation of the third embodiment will be mainly described below.

Figure 25:
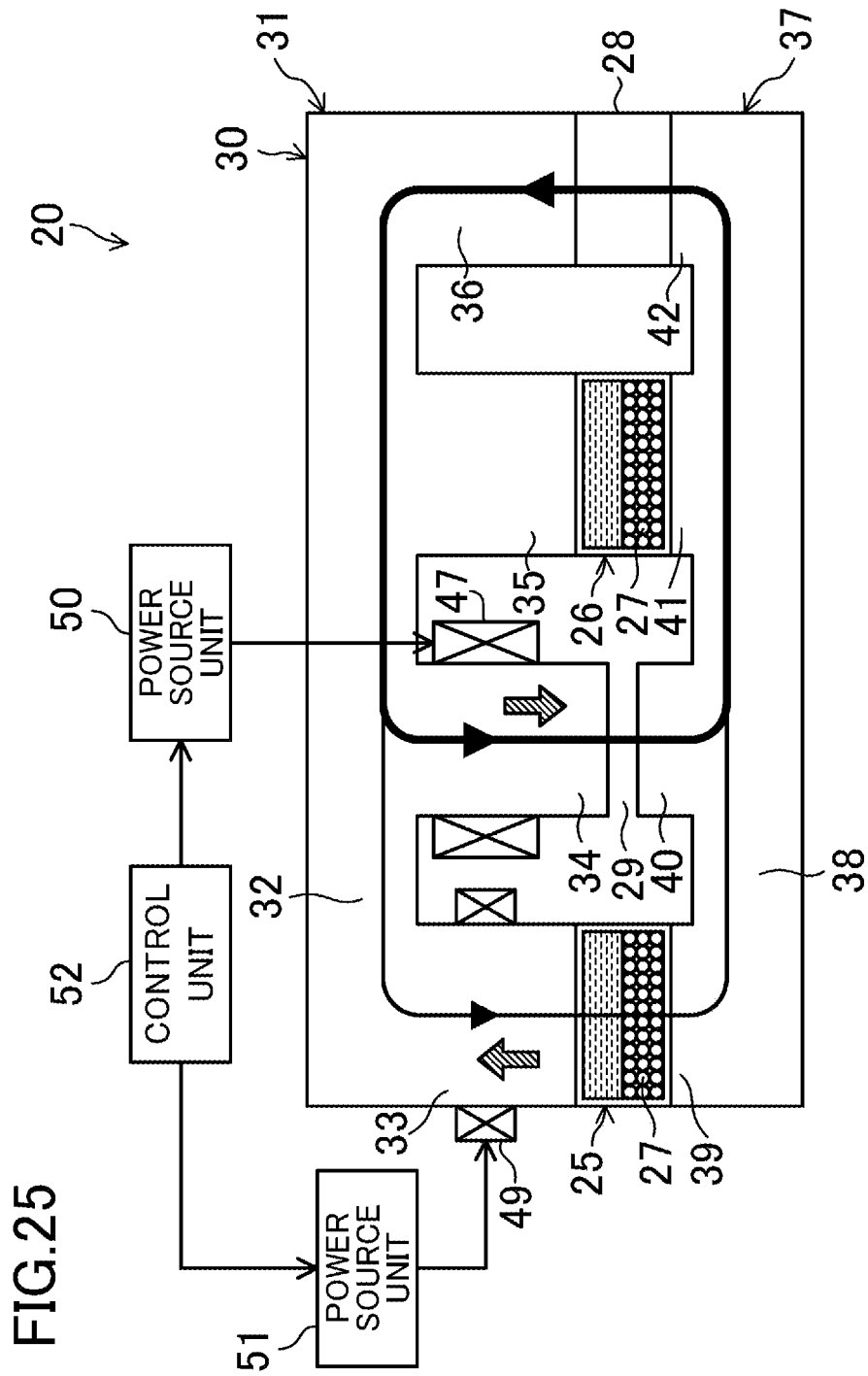
FIG. 25 is a front view schematically illustrating a configuration of a magnetic field application device according to a second variation of the third embodiment, in which a negative current flows through the coil and an auxiliary coil.

As shown in FIG. 25, the magnetic field application device (20) includes an auxiliary coil (49). This auxiliary coil (49) is provided in the first closed magnetic circuit (44), more specifically, on the first upper arm portion (33). In FIG. 25, thick solid line arrows indicate a composite of a magnetic field generated by the permanent magnet (28) and a magnetic field generated by the coil (47); a thin solid arrow indicates a magnetic field generated by the permanent magnet (28); and a thick arrow indicates the direction of the magnetic field generated by the coil (47).

The auxiliary coil (49) is intended to bring the intensity of the magnetic field applied to the first magnetic field application unit (25) and the intensity of the magnetic field applied to the second magnetic field application unit (26) close to each other when the magnetic field cannot be uniformly applied to the first and second magnetic field application units (25, 26) only by the coil (47) due to different magnetic resistances between the first and second magnetic field application units (25, 26). For example, in the example illustrated in FIG. 25, passing a negative current through the coil (47) can remove the magnetic field from the second magnetic field application unit (26), but cannot sufficiently remove the magnetic field from the first magnetic field application unit (25). In such a case, the negative current (i.e., a current for generating an upward magnetic field in the auxiliary coil (49)) is allowed to flow through the auxiliary coil (49) to remove the magnetic field from the first magnetic field application unit (25).

The magnetic field application device (20) also includes a first power source unit (50) and a second power source unit (51). The first power source unit (50) is connected to the coil. The second power source unit (51) is connected to the auxiliary coil (49).

Also in the present variation, the same advantages as those of the first variation of the third embodiment are obtained.

The magnetic field application device (20) of the present variation includes the auxiliary coil (49) provided in the first closed magnetic circuit (44) or the second closed magnetic circuit (45), and the control unit (52) is configured to control the current flowing through the auxiliary coil (49) to bring the intensities of the magnetic fields applied to the magnetic working substances (27) of the first and second magnetic field application units (25, 26) close to each other. Thus, the intensities of the magnetic fields applied to the magnetic working substances (27) of the first and second magnetic field application units (25, 26) can be brought close to each other by means of the auxiliary coil (49). This configuration is provided assuming that the intensities of the magnetic fields applied to the first and second magnetic field application units (25, 26) become unbalanced because their magnetic resistances are different from each other due to different temperatures thereof. The auxiliary coil (49) is used to reduce such imbalance, i.e., to balance the magnetic fields applied to the magnetic working substances (27) of the first and second magnetic field application units (25, 26) as much as possible.

Third Variation of Third Embodiment

Figure 26:
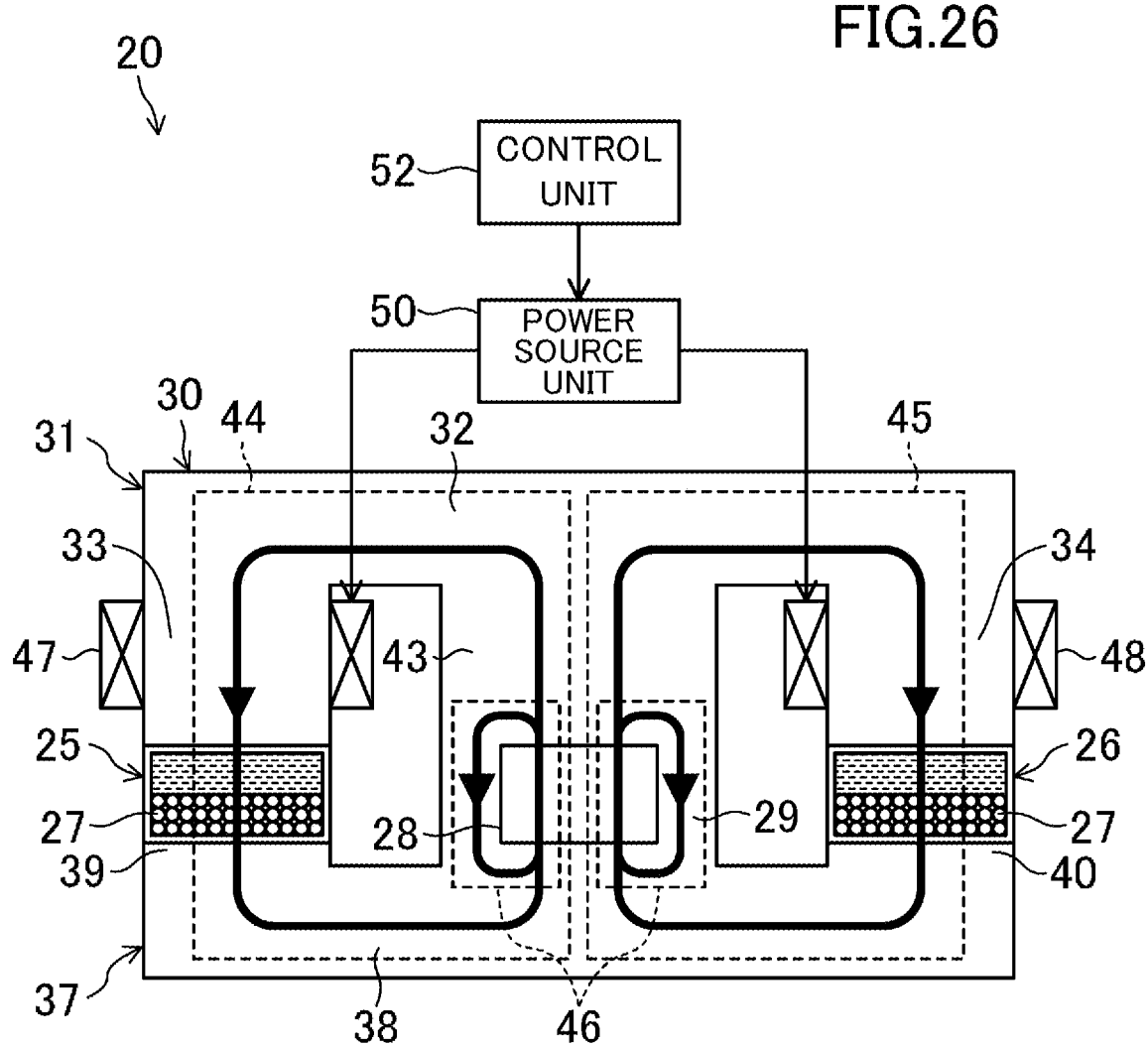
FIG. 26 is a front view schematically illustrating a configuration of a magnetic field application device according to a third variation of the third embodiment, in which first and second coils are non-energized.
Figure 27:
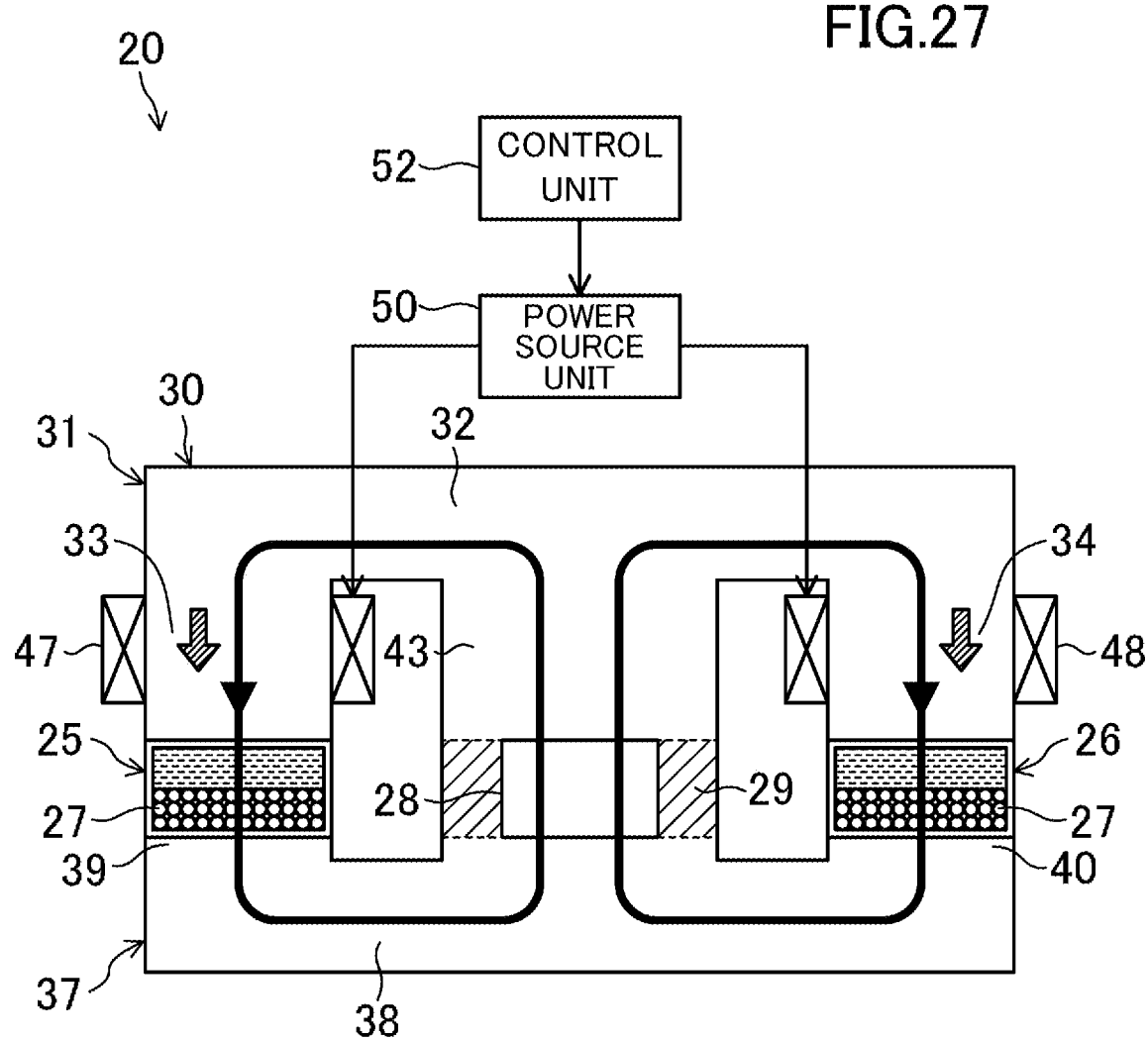
FIG. 27 is a view similar to FIG. 26, in which a positive current flows through the first and second coils.
Figure 28:
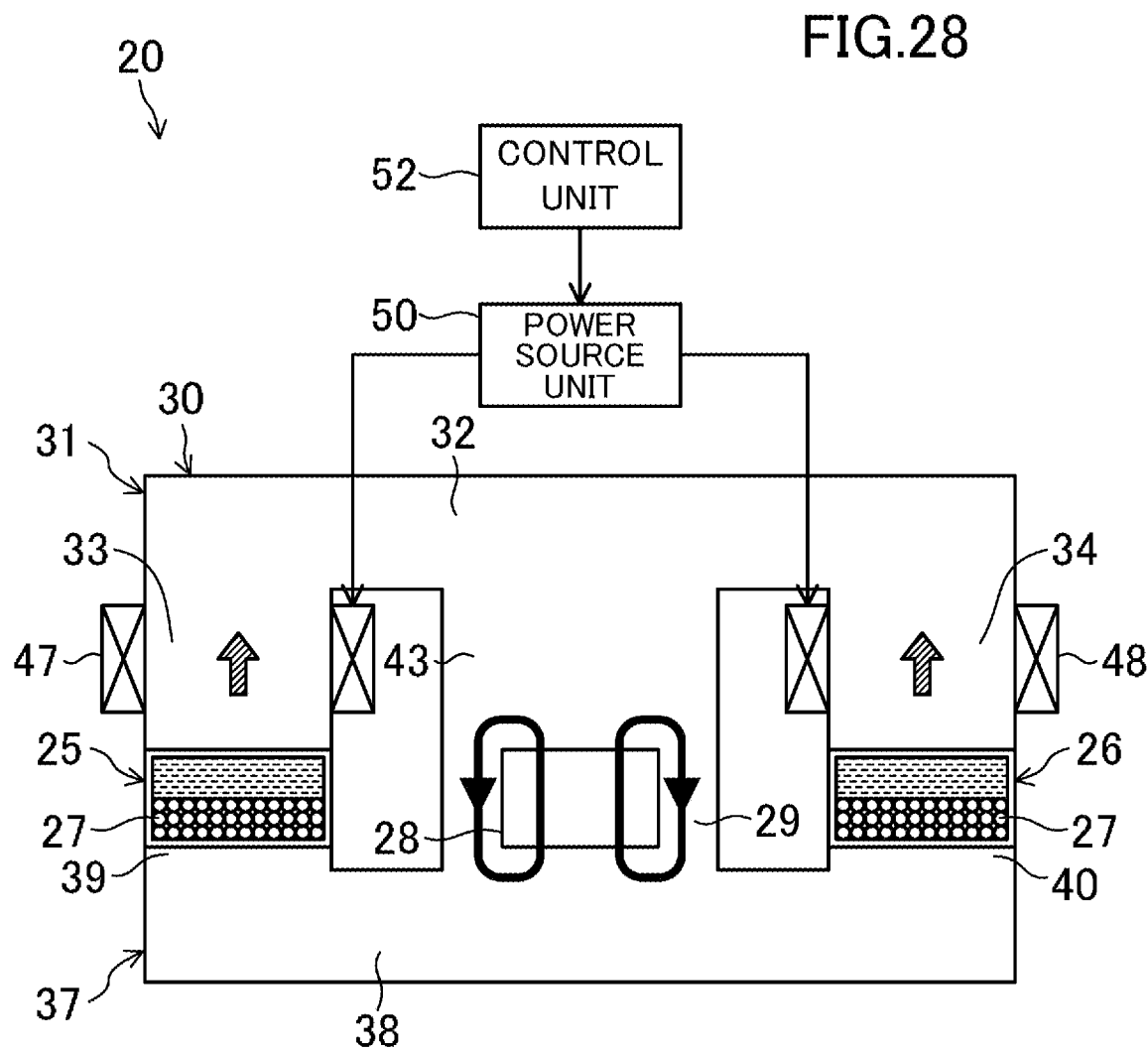
FIG. 28 is a view similar to FIG. 26, in which a negative current flows through the first and second coils.

A third variation of the third embodiment will be described below. A magnetic field application device (20) according to this variation is different from that of the third embodiment in the configuration of the yoke (30). Thus, differences from the third embodiment will be mainly described below. In FIG. 26, solid line arrows indicate a magnetic field generated by the permanent magnet (28). In FIGS. 27 and 28, solid line arrows indicate a composite of the magnetic field generated by the permanent magnet (28) and a magnetic field generated by the coil (47), and a thick arrow indicates the direction of the magnetic field generated by the coil (47).

As shown in FIG. 26, the yoke (30) of the present variation includes a single yoke member (31). The yoke member (31) has a pillar portion (43) extending in the vertical direction in FIG. 26, an upper beam portion (32) extending from an upper end of the pillar portion (43) to the left and the right, a lower beam portion (38) extending from a lower end of the pillar portion (43) to the left and the right, a first upper arm portion (33) protruding downward from one end (left end in FIG. 26) of the upper beam portion (32), a second upper arm portion (34) protruding downward from the other end (right end in FIG. 26) of the upper beam portion (32), a first lower arm portion (39) protruding upward from one end (left end in FIG. 26) of the lower beam portion (38), and a second lower arm portion (40) protruding upward from the other end (right end in FIG. 26) of the lower beam portion (38).

A first magnetic field application unit (25) is supported between the first upper arm portion (33) and the first lower arm portion (39). A second magnetic field application unit (26) is supported between the second upper arm portion (34) and the second lower arm portion (40). The pillar portion (43) has a permanent magnet (28) embedded therein. The first upper arm portion (33) is provided with a first coil (47). The second upper arm portion (34) is provided with a second coil (48).

The yoke (30) forms a first closed magnetic circuit (44) which is a closed circuit that magnetically connects the first magnetic field application unit (25) and the permanent magnet (28) in series via the first upper arm portion (33), the upper beam portion (32), the pillar portion (43), the lower beam portion (38), and the first lower arm portion (39). The yoke (30) also forms a second closed magnetic circuit (45) which is a closed circuit that magnetically connects the second magnetic field application unit (26) and the permanent magnet (28) in series via the second upper arm portion (34), the upper beam portion (32), the pillar portion (43), the lower beam portion (38), and the second lower arm portion (40). The yoke (30) also forms a third closed magnetic circuit (46) which is a closed circuit that magnetically connects upper and lower ends of the permanent magnet (28) in series via the pillar portion (43).

In other words, the yoke (30) forms the first closed magnetic circuit (44), the second closed magnetic circuit (45), and the third closed magnetic circuit (46) each of which is a closed circuit that magnetically connects both ends in the magnetization direction of the permanent magnet (28). The first closed magnetic circuit (44) is provided with the first magnetic field application unit (25), and the second closed magnetic circuit (45) is provided with the second magnetic field application unit (26). Part of the pillar portion (43) on the left and right of the permanent magnet (28) (hatched in FIG. 27) serves as a magnetic resistance portion (29) that causes magnetic saturation and serves as a large magnetic resistance (see FIG. 27) when a positive current (i.e., a current for generating a downward magnetic field in the first and second coils (47, 48)) flows through the first and second coils (47, 48).

When the positive current flows through the first and second coils (47, 48), the magnetic fields applied to the first and second magnetic field application units (25, 26) are strengthened (see FIG. 27). At this time, magnetic saturation occurs in part of the pillar portion (43) on the left and right of the permanent magnet (28). When a negative current (i.e., a current for generating an upward magnetic field in the first and second coils (47, 48)) flows through the first and second coils (47, 48), the magnetic fields applied to the first and second magnetic field application units (25, 26) are weakened (see FIG. 28). At this time, the magnetic flux of the permanent magnet (28) circulates in the pillar portion (43).

Also in the present variation, the same advantages as those of the third embodiment are obtained.

Fourth Embodiment

A fourth embodiment will be described below. A magnetic field application device (20) of the present embodiment is different from that of the first embodiment in the configuration of the yoke (30), and the arrangement of the coil (47). Thus, differences from the first embodiment will be mainly described below.

Figure 29:
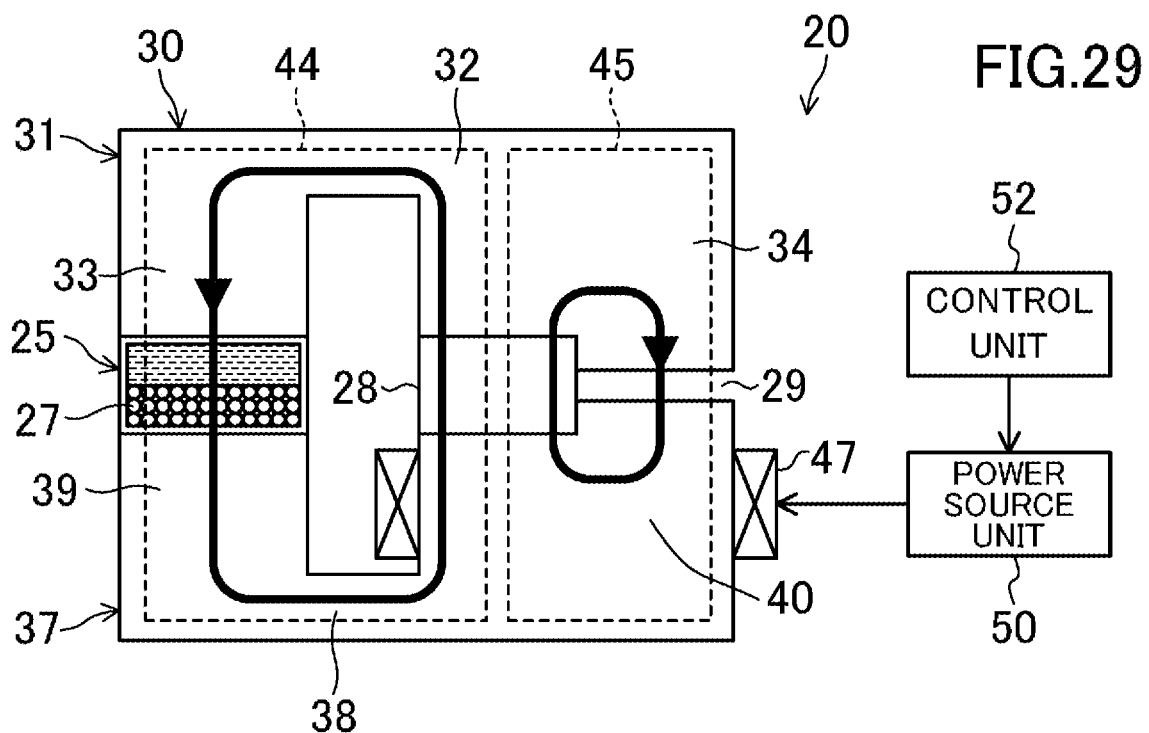
FIG. 29 is a front view schematically illustrating a configuration of a magnetic field application device according to a fourth embodiment, in which a coil is non-energized.

Unlike the yoke (30) of the first embodiment, the yoke (30) shown in FIG. 29 has a shape in which the second upper arm portion (34) and the third upper arm portion (35) are connected together, and the second lower arm portion (40) and the third lower arm portion (41) are connected together. In the present embodiment, portions corresponding to the second upper arm portion (34) and third upper arm portion (35) of the first embodiment are collectively referred to as the second upper arm portion (34), and portions corresponding to the second lower arm portion (40) and third lower arm portion (41) of the first embodiment are collectively referred to as the second lower arm portion (40).

Figure 30:
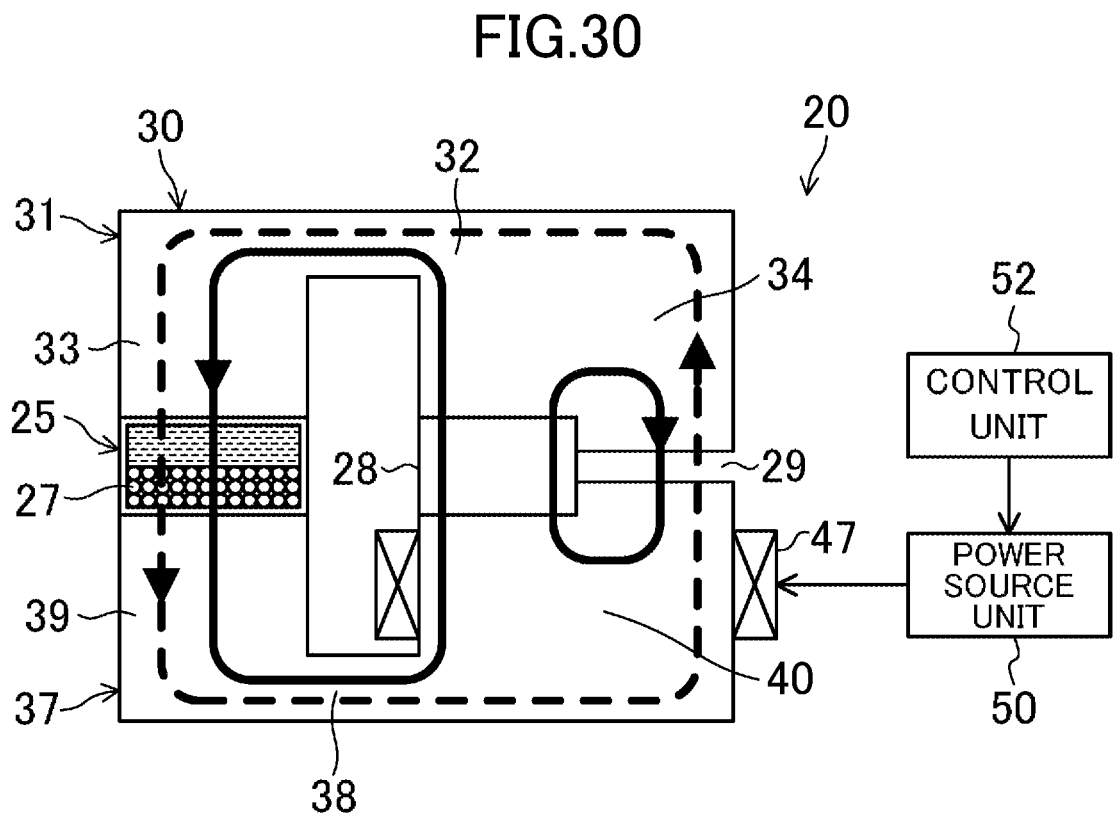
FIG. 30 is a view similar to FIG. 29, in which a positive current flows through the coil.
Figure 31:
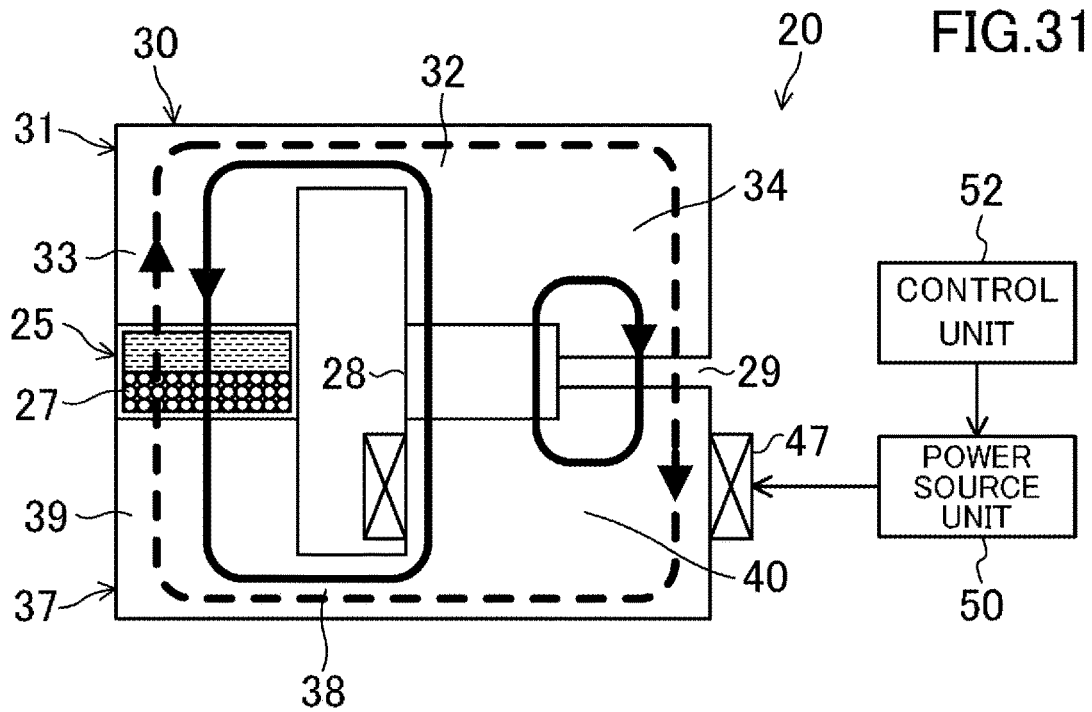
FIG. 31 is a view similar to FIG. 29, in which a negative current flows through the coil.

The coil (47) is provided across the first closed magnetic circuit (44) and the second closed magnetic circuit (45), more specifically, on the second lower arm portion (40). When a positive current (i.e., a current for generating an upward magnetic field in the coil (47)) flows through the coil (47), the magnetic field applied to the magnetic field application unit (25) is strengthened (see FIG. 30). When a negative current (i.e., a current for generating a downward magnetic field in the coil (47)) flows through the coil (47), the magnetic field applied to the magnetic field application unit (25) is weakened (see FIG. 31).

Advantages of Fourth Embodiment

Also in the present embodiment, the same advantages as those of the first embodiment can be obtained.

Reference Example 1

Figure 32:
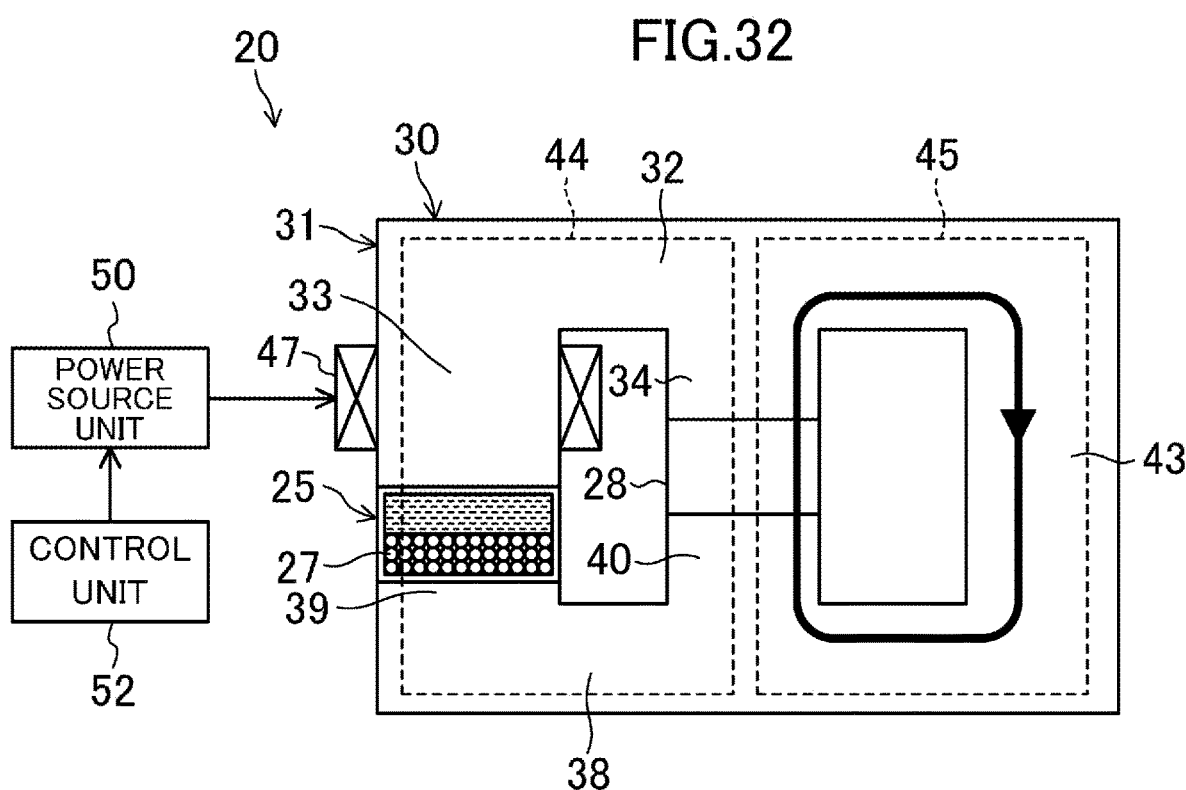
FIG. 32 is a front view schematically illustrating a configuration of a magnetic field application device according to a first reference example, in which a coil is non-energized.

Reference Example 1 will be described below. FIG. 32 is a front view schematically illustrating a configuration of a magnetic field application device (20). As shown in this figure, the magnetic field application device (20) includes a magnetic field application unit (25), a permanent magnet (28), a yoke (30), a coil (47), a power source unit (50), and a control unit (52). In the drawings, solid line arrows indicate a magnetic field generated by the permanent magnet (28), and broken line arrows indicate a magnetic field generated by the coil (47).

The magnetic field application unit (25) is comprised of an AMR bed which houses the magnetic working substance (27) and in which a heating medium flows. The magnetic working substance (27) generates heat when a magnetic field is applied thereto, and absorbs heat when the magnetic field is removed therefrom. Examples of the material of the magnetic working substance (27) include $Gd_5(Ge_{0.5}Si_{0.5})_4$, $La(Fe_{1-x}Si_x)_{13}$, $La(Fe_{1-x}CO_xSi_y)_{13}$, $La(Fe_{1-x}Si_x)_{13}H_y$, and $Mn(As_{0.9}Sb_{0.1})$.

The permanent magnet (28) is a sintered magnet having a rectangular parallelepiped shape, contains neodymium, and contains no heavy rare earths. The permanent magnet (28) is magnetized in the vertical direction so that an upper end thereof serves as an N-pole and a lower end thereof as an S-pole. As shown in FIG. 32, the permanent magnet (28) produces a magnetic flux that flows through the pillar portion (43) of the yoke member (31) when the coil (47) is non-energized. The permanent magnet (28) may be magnetized in the vertical direction so that the upper end serves as an S-pole and the lower end as an N-pole.

The yoke (30) includes a single yoke member (31). The yoke member (31) is made of a magnetic material. The yoke member (31) has a pillar portion (43) extending in the vertical direction in FIG. 32, an upper beam portion (32) extending from an upper end of the pillar portion (43) to the left, a lower beam portion (38) extending from a lower end of the pillar portion (43) to the left, a first upper arm portion (33) protruding downward from a left end of the upper beam portion (32), a second upper arm portion (34) protruding downward from the center of the upper beam portion (32), a first lower arm portion (39) protruding upward from a left end of the lower beam portion (38), and a second lower arm portion (40) protruding upward from the center of the lower beam portion (38).

The magnetic field application unit (25) is supported between the first upper arm portion (33) and the first lower arm portion (39). The permanent magnet (28) is supported between the second upper arm portion (34) and the second lower arm portion (40). The first upper arm portion (33) is provided with a coil (47).

The yoke (30) forms a first closed magnetic circuit (44) which is a closed circuit that magnetically connects the magnetic field application unit (25) and the permanent magnet (28) in series via the first upper arm portion (33), the upper beam portion (32), the second upper arm portion (34), the second lower arm portion (40), the lower beam portion (38), and the first lower arm portion (39). The yoke (30) also forms a second closed magnetic circuit (45) which is a closed circuit that magnetically connects upper and lower ends of the permanent magnet (28) in series via the second upper arm portion (34), the upper beam portion (32), the pillar portion (43), the lower beam portion (38), and the second lower arm portion (40).

In other words, the yoke (30) forms the first closed magnetic circuit (44) and the second closed magnetic circuit (45) each of which is a closed circuit that magnetically connects both ends in the magnetization direction of the permanent magnet (28). The first closed magnetic circuit (44) is provided with the magnetic field application unit (25).

The coil (47) is provided in the first closed magnetic circuit (44), more specifically, on the first upper arm portion (33). When a positive current (i.e., a current for generating a downward magnetic field in the coil (47)) flows through the coil (47), the magnetic field applied to the magnetic field application unit (25) is strengthened (see FIG. 33).

The power source unit (50) is a device connected to the coil (47) and causes the current to flow through the coil (47). The power source unit (50) is configured to allow, for example, a rectangular positive current to flow through the coil (47).

The control unit (52) is a device connected to the power source unit (50) and controls the current flowing through the coil (47). The control unit (52) controls the current flowing through the coil (47) so that the current flows in a direction in which the magnetic field applied to the magnetic working substance (27) is strengthened. Specifically, the control unit (52) controls the power source unit (50) so that the positive current flows through the coil (47), or no current flows through the coil (47).

Advantages of Reference Example 1

The magnetic field application device (20) of the present reference example includes: a magnetic field application unit (25) provided with a magnetic working substance (27) and applying a magnetic field to the magnetic working substance (27); a permanent magnet (28); and a yoke (30). The yoke (30) forms a first closed magnetic circuit (44) which is a closed circuit that magnetically connects the magnetic field application unit (25) and the permanent magnet (28) via the yoke (30), and a second closed magnetic circuit (45) which is a closed circuit that magnetically connects both ends in a magnetization direction of the permanent magnet (28) via the yoke (30). The magnetic field application device (20) includes a coil (47) provided in an open magnetic circuit that constitutes the first closed magnetic circuit (44) and does not constitute the second closed magnetic circuit (45), and a control unit (52) that controls the current flowing through the coil (47) such that the current flows in a direction in which the magnetic field of the permanent magnet (28) is strengthened. When the current flows through the coil (47) as described above, the operating point of the permanent magnet (28) becomes relatively high, and the permanent magnet (28) can sufficiently exhibit its performance. This makes it possible to overcome the disadvantage of the magnetic field application device of Patent Document 1, i.e., the magnetic field generated when the current flows through the coil acts to weaken the magnetic field of the permanent magnet, which makes the operating point of the permanent magnet relatively low, and prevents the permanent magnet from sufficiently exhibiting its performance. Further, since no inverse magnetic field is applied to the permanent magnet (28), a permanent magnet (28) that contains no heavy rare earths can be used. This makes it possible to use a magnet having a higher residual magnetic flux density, and to reduce the coil current through reducing the magnetic flux generated in the coil (47).

Reference Example 2

Figure 35:
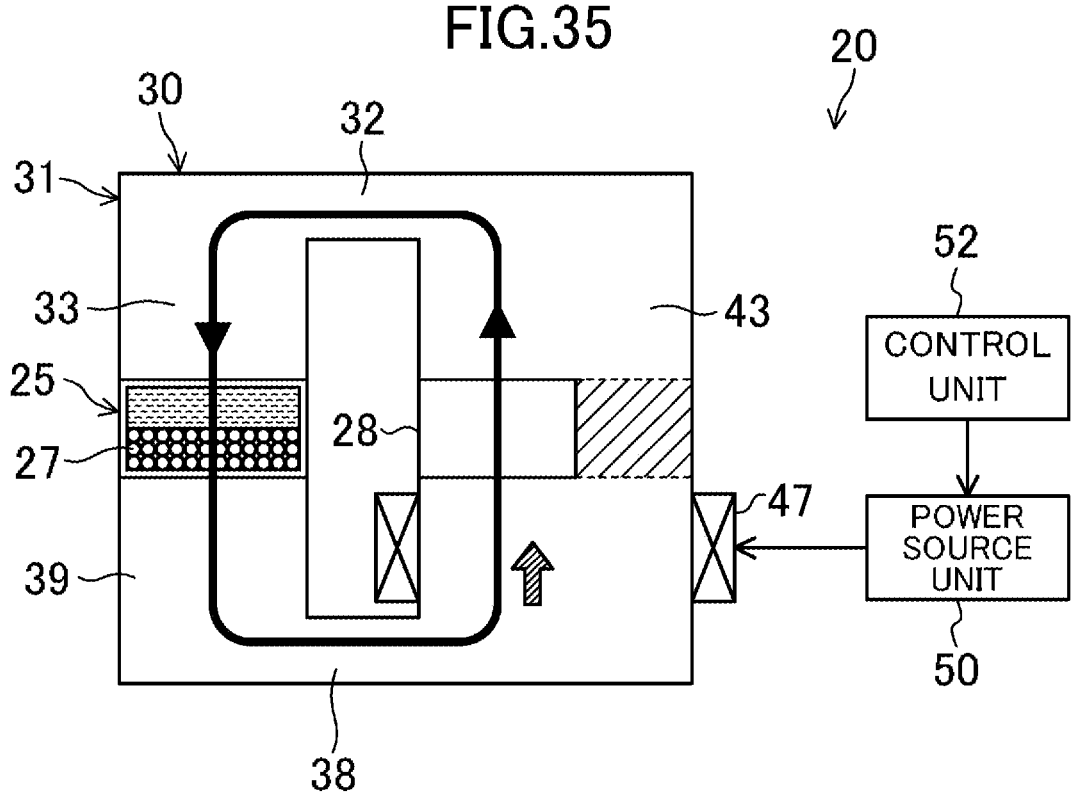
FIG. 35 is a view similar to FIG. 34, in which a positive current flows through the coil.

Reference Example 2 will be described below. FIG. 34 is a front view schematically illustrating a configuration of a magnetic field application device (20). As shown in this figure, the magnetic field application device (20) includes a magnetic field application unit (25), a permanent magnet (28), a yoke (30), a coil (47), a power source unit (50), and a control unit (52). In FIG. 34, solid line arrows indicate a magnetic field generated by the permanent magnet (28), and a thick arrow indicates a direction of a magnetic field generated by the coil (47). In FIG. 35, solid line arrows indicate a composite of the magnetic field generated by the permanent magnet (28) and the magnetic field generated by the coil (47).

The magnetic field application unit (25) is comprised of an AMR bed which houses the magnetic working substance (27) and in which a heating medium flows. The magnetic working substance (27) generates heat when a magnetic field is applied thereto, and absorbs heat when the magnetic field is removed therefrom. Examples of the material of the magnetic working substance (27) include $Gd_5(Ge_{0.5}Si_{0.5})_4$, $La(Fe_{1-x}Si_x)_{13}$, $La(Fe_{1-x}CO_xSi_y)_{13}$, $La(Fe_{1-x}Si_x)_{13}H_y$, and $Mn(As_{0.9}Sb_{0.1})$.

The permanent magnet (28) is a sintered magnet having a rectangular parallelepiped shape, contains neodymium, and contains no heavy rare earths. The permanent magnet (28) is magnetized in the vertical direction so that an upper end thereof serves as an N-pole and a lower end thereof as an S-pole. As shown in FIG. 34, the permanent magnet (28) produces a magnetic flux that flows through the pillar portion (43) of the yoke member (31) when the coil (47) is non-energized. The permanent magnet (28) may be magnetized in the vertical direction so that the upper end serves as the S-pole and the lower end as the N-pole.

The yoke (30) includes a single yoke member (31). The yoke member (31) is made of a magnetic material. The yoke member (31) has a pillar portion (43) extending in the vertical direction in FIG. 34, an upper beam portion (32) extending from an upper end of the pillar portion (43) to the left, a lower beam portion (38) extending from a lower end of the pillar portion (43) to the left, an upper arm portion (33) protruding downward from a left end of the upper beam portion (32), and a lower arm portion (39) protruding upward from a left end of the lower beam portion (38).

The magnetic field application unit (25) is supported between the upper arm portion (33) and the lower arm portion (39). The permanent magnet (28) is inserted into and fixed to the pillar portion (43). The pillar portion (43) is provided with the coil (47).

The yoke (30) forms a first closed magnetic circuit (44) which is a closed circuit that magnetically connects the magnetic field application unit (25) and the permanent magnet (28) in series via the upper arm portion (33), the upper beam portion (32), the pillar portion (43), the lower beam portion (38), and the lower arm portion (39). The yoke (30) also forms a second closed magnetic circuit (45) which is a closed circuit that magnetically connects upper and lower ends of the permanent magnet (28) in series via the pillar portion (43).

In other words, the yoke (30) forms the first closed magnetic circuit (44) and the second closed magnetic circuit (45) each of which is a closed circuit that magnetically connects both ends in the magnetization direction of the permanent magnet (28). The first closed magnetic circuit (44) is provided with the magnetic field application unit (25). The second closed magnetic circuit (45) is formed by the yoke (30).

The coil (47) is provided across the first closed magnetic circuit (44) and the second closed magnetic circuit (45), more specifically, on the pillar portion (43). When a positive current (i.e., a current for generating an upward magnetic field in the coil (47)) flows through the coil (47), the magnetic field applied to the magnetic field application unit (25) is strengthened (see FIG. 35). Further, when the positive current flows through the coil (47), the magnetic field of the permanent magnet (28) is strengthened, and magnetic saturation occurs in the second closed magnetic circuit (45), more specifically, in part of the pillar portion (43) on the right of the permanent magnet (28) (hatched in FIG. 35).

The power source unit (50) is a device connected to the coil (47) and causes the current to flow through the coil (47). The power source unit (50) is configured to allow, for example, a rectangular positive current to flow through the coil (47).

The control unit (52) is a device connected to the power source unit (50) and controls the current flowing through the coil (47). The control unit (52) controls the current flowing through the coil (47) so that the current flows in a direction in which the magnetic field applied to the magnetic working substance (27) is strengthened. Specifically, the control unit (52) controls the power source unit (50) so that the positive current flows through the coil (47), or no current flows through the coil (47).

Advantages of Reference Example 2

The magnetic field application device (20) of the present reference example includes: a magnetic field application unit (25) provided with a magnetic working substance (27) and applying a magnetic field to the magnetic working substance (27); a permanent magnet (28); and a yoke (30). The yoke (30) forms a first closed magnetic circuit (44) which is a closed circuit that magnetically connects in series the magnetic field application unit (25) and the permanent magnet (28) via the yoke (30), and a second closed magnetic circuit (45) which is a closed circuit that magnetically connects both ends in a magnetization direction of the permanent magnet (28) via the yoke (30). The magnetic field application device (20) includes a coil (47) provided in an open magnetic circuit that constitutes the first closed magnetic circuit (44) and the second closed magnetic circuit (45), and a control unit (52) that controls the current flowing through the coil (47) to flow in a direction in which the magnetic field of the permanent magnet (28) is strengthened. When the current flows through the coil (47) as described above, the operating point of the permanent magnet (28) becomes relatively high, and the permanent magnet (28) can sufficiently exhibit its performance. This makes it possible to overcome the disadvantage of the magnetic field application device of Patent Document 1, i.e., the magnetic field generated when the current flows through the coil acts to weaken the magnetic field of the permanent magnet, which makes the operating point of the permanent magnet relatively low, and prevents the permanent magnet from sufficiently exhibiting its performance. Further, since no inverse magnetic field is applied to the permanent magnet (28), a permanent magnet (28) that contains no heavy rare earths can be used. This makes it possible to use a magnet having a higher residual magnetic flux density, and to reduce the coil current through reducing the magnetic flux generated in the coil (47).

Other Embodiments

The above-described embodiments may be modified as follows.

For example, in each of the above-described embodiments and variations, the coil (47, 48) and the auxiliary coil (49) may be divided into two or more. As a specific example, two or more coils may be provided for the third lower arm portion (41) of the device of the first embodiment, or two coils may be provided for each of the first upper arm portion (33) and third upper arm portion (35) of the device of the third embodiment.

Further, for example, in each of the above-described embodiments and variations, the positions of the coil (47, 48) and the auxiliary coil (49) may be changed as long as their magnetic effects do not vary. As a specific example, the coil (47, 48) may be provided for the third upper arm portion (35) of the device of the first embodiment, or the coil (47, 48) may be provided for at least one of the third upper arm portion (35) or third lower arm portion (41) of the device of the second embodiment.

Further, for example, each yoke member (31, 37) constituting the yoke (30) may be comprised of a plurality of pieces. As a specific example, the upper coupling portion (32) and first to third upper arm portions (33 to 35) of the first yoke member (31) of the first embodiment may be independently formed and joined together.

Further, for example, in each of the above-described embodiments variations, two or more permanent magnets (28) may be provided. Specifically, the device of the first embodiment may further include a fourth upper arm portion protruding downward from the center of the upper coupling portion (32) and a fourth lower arm portion protruding upward from the center of the lower coupling portion (38), and the permanent magnet (28) may be supported between the fourth upper arm portion and the fourth lower arm portion. In this case, the permanent magnet (28) supported between the second upper arm portion (34) and the second lower arm portion (40) and the permanent magnet (28) supported between the fourth upper arm portion and the fourth lower arm portion may be virtually regarded as a single permanent magnet (28), and the present technology may be applied thereto. Alternatively, the present technology may be applied to each of the permanent magnets (28).

Further, for example, in each of the above-described embodiments and variations, two or more magnetic resistance portions (29) may be provided. As a specific example, the device of the second variation of the first embodiment may further include a fourth upper arm portion protruding downward from one end (right end in FIG. 9) of the upper coupling portion (32) and a fourth lower arm portion protruding upward from one end (right end in FIG. 9) of the lower coupling portion (38), and the magnetic resistance portion (29) may be formed between the fourth upper arm portion and the fourth lower arm portion. In this case, the magnetic resistance portion (29) supported between the third upper arm portion (35) and the third lower arm portion (41) and the magnetic resistance portion (29) supported between the fourth upper arm portion and the fourth lower arm portion may be virtually regarded as a single magnetic resistance portion (29), and the present technology may be applied thereto. Alternatively, the present technology may be applied to each of the magnetic resistance portions (29).

Further, for example, in each of the above-described embodiments and variations, two or more magnetic field application units (25) may be provided. As a specific example, two or more magnetic field application units (25, 26) may be provided in the devices of the first embodiment, the fourth embodiment, and Reference Examples 1 and 2, or three or more magnetic field application units (25, 26) may be provided in the devices of the second and third embodiments. In this case, the present technology may be applied to each of the magnetic field application units (25, 26).

While embodiments and variations have been described above, it will be understood that various modifications in form and detail may be made without departing from the spirit and scope of the present disclosure as set forth in the appended claims. The foregoing embodiments and variations may be appropriately combined or replaced unless the function of the target of the present disclosure is impaired.

As can be seen from the foregoing description, the present disclosure is useful for a magnetic field application device.

The invention claimed is:

1. A magnetic field application device, comprising:
a magnetic field application unit provided with a magnetic working substance, the magnetic field application unit applying a magnetic field to the magnetic working substance;
a permanent magnet;
a yoke that forms at least two closed magnetic circuits, each of which being a closed circuit that magnetically connects both ends in a magnetization direction of the permanent magnet; and
a coil capable of changing an intensity of the magnetic field applied to the magnetic working substance, the coil being provided in at least one of the closed magnetic circuits,
the magnetic field application unit being disposed in at least one of the closed magnetic circuits, and
the magnetic field application unit, the permanent magnet, the yoke and the coil being configured such that a magnetic flux of the permanent magnet is branched to flow through two or more of the closed magnetic circuits including the closed magnetic circuit provided with the magnetic field application unit when the coil is non-energized.

2. The magnetic field application device of claim 1, wherein
the closed magnetic circuits include a first closed magnetic circuit and a second closed magnetic circuit, and
the magnetic field application unit, the permanent magnet, the yoke and the coil are configured such that $0.01 \times R1 \leq R2 \leq 100 \times R1$, where
R1 is a magnetic resistance of part of the first closed magnetic circuit excluding the permanent magnet, and
R2 is a magnetic resistance of part of the second closed magnetic circuit excluding the permanent magnet.

3. The magnetic field application device of claim 1, wherein
the magnetic field application unit, the permanent magnet, the yoke and the coil are configured such that $0.1 \times Bmax \leq B0 \leq 0.5 \times Bmax$, where
Bmax is a magnetic flux density in the magnetic working substance when a maximum current flows through the coil in a direction in which the magnetic field applied to the magnetic working substance is strengthened, and
B0 is a magnetic flux density in the magnetic working substance when the coil is non-energized.

4. The magnetic field application device of claim 1, further comprising:
a magnetic resistance portion provided in at least one of the closed magnetic circuits not having the magnetic field application unit.

5. The magnetic field application device of claim 4, wherein
the magnetic resistance portion includes an air gap or a non-magnetic body.

6. The magnetic field application device of claim 1, further comprising:
a control unit configured to control a current flowing through the coil such that the current selectively flows in directions in which the magnetic field applied to the magnetic working substance is strengthened and weakened.

7. The magnetic field application device of claim 6, wherein
the magnetic field application unit, the permanent magnet, the yoke, the coil and the control unit are configured such that $B0 \approx (Bmax-Bmin)/2$, where
Bmax is a magnetic flux density in the magnetic working substance when a maximum current flows through the coil in the direction in which the magnetic field applied to the magnetic working substance is strengthened,
Bmin is a magnetic flux density in the magnetic working substance when a maximum current flows through the coil in the direction in which the magnetic field applied to the magnetic working substance is weakened, and
B0 is a magnetic flux density in the magnetic working substance when the coil is non-energized.

8. The magnetic field application device of claim 6, wherein
the control unit is further configured to control the current flowing through the coil such that $|Bmin|<B0<Bmax$ is satisfied, where
Bmax is a magnetic flux density in the magnetic working substance when a maximum current flows through the coil in the direction in which the magnetic field applied to the magnetic working substance is strengthened,
Bmin is a magnetic flux density in the magnetic working substance when a maximum current flows through the coil in the direction in which the magnetic field applied to the magnetic working substance is weakened, and
B0 is a magnetic flux density in the magnetic working substance when the coil is non-energized.

9. The magnetic field application device of claim 8, wherein
the control unit is further configured to control the current flowing through the coil such that $|Bmin|$ becomes zero.

10. The magnetic field application device of claim 1, wherein the magnetic field application unit, the permanent magnet, the yoke and the coil are configured such that B0>0, where B0 is a magnetic flux density in the magnetic working substance when the coil is non-energized.

11. The magnetic field application device of claim 1, wherein
the closed magnetic circuits include a first closed magnetic circuit provided with the magnetic field application unit, and a second closed magnetic circuit provided with a magnetic resistance portion, and
the coil is provided in the second closed magnetic circuit.

12. The magnetic field application device of claim 11, wherein
the magnetic field application unit, the permanent magnet, the yoke and the coil are configured such that $(k1+k2+k1 \cdot k2)/k1 < \sqrt{2}$, where
Ramr is a magnetic resistance of the magnetic field application unit,
Rmag is a magnetic resistance of the permanent magnet,
R1 is a magnetic resistance of the magnetic resistance portion,
Rmag/Ramr=k1, and
R1/Ramr=k2.

13. The magnetic field application device of claim 1, wherein
the closed magnetic circuits include a first closed magnetic circuit provided with the magnetic field application unit, and a second closed magnetic circuit provided with a magnetic resistance portion, and
the coil is provided in the first closed magnetic circuit.

14. The magnetic field application device of claim 13, wherein
the magnetic field application unit, the permanent magnet, the yoke and the coil are configured such that $(k1+k2+k1 \cdot k2)/(k1+K2) < \sqrt{2}$, where
Ramr is a magnetic resistance of the magnetic field application unit,
Rmag is a magnetic resistance of the permanent magnet,
R1 is a magnetic resistance of the magnetic resistance portion,
Rmag/Ramr=k1, and
R1/Ramr=k2.

15. The magnetic field application device of claim 1, further comprising:
a control unit,
the magnetic field application unit including a first magnetic field application unit and a second magnetic field application unit,
the closed magnetic circuits including a first closed magnetic circuit provided with the first magnetic field application unit, and a second closed magnetic circuit provided with the second magnetic field application unit,
the coil being provided in at least one of the first closed magnetic circuit and the second closed magnetic circuit, and
the control unit being configured to control the current flowing through the coil such that the current selectively flows in
a direction in which the magnetic field applied to the magnetic working substance of the first magnetic field application unit is strengthened and the magnetic field applied to the magnetic working substance of the second magnetic field application unit is weakened, and
a direction in which the magnetic field applied to the magnetic working substance of the first magnetic field application unit is weakened and the magnetic field applied to the magnetic working substance of the second magnetic field application unit is strengthened.

16. The magnetic field application device of claim 15, wherein
the magnetic field application unit, the permanent magnet, the yoke, the coil and the control unit are configured such that when the current flows through the coil in the direction in which the magnetic field applied to the magnetic working substance of one of the first magnetic field application unit and the second magnetic field application unit is weakened, a magnetic field of the permanent magnet is applied to the magnetic working substance of the other one of the first magnetic field application unit and the second magnetic field application unit.

17. The magnetic field application device of claim 15, wherein
the coil is provided in only one of the first closed magnetic circuit and the second closed magnetic circuit.

18. The magnetic field application device of claim 15, wherein
the coil is provided in each of the first closed magnetic circuit and the second closed magnetic circuit.

19. The magnetic field application device of claim 4, further comprising:
a control unit,
the magnetic field application unit including a first magnetic field application unit and a second magnetic field application unit,
the coil including a first coil and a second coil,
the closed magnetic circuits including
a first closed magnetic circuit provided with the first magnetic field application unit and the first coil,
a second closed magnetic circuit provided with the second magnetic field application unit and the second coil, and
a third closed magnetic circuit provided with the magnetic resistance portion,
the magnetic field application unit, the permanent magnet, the yoke, the coil and the magnetic resistance portion being configured such that a magnetic flux of the permanent magnet is branched to flow through the first closed magnetic circuit, the second closed magnetic circuit, and the third closed magnetic circuit when the first coil and the second coil are non-energized, and
the control unit being configured to control
the current flowing through the first coil such that the current selectively flows in the directions in which the magnetic field applied to the magnetic working substance of the first magnetic field application unit is strengthened and weakened, and
the current flowing through the second coil such that the current selectively flows in the directions in which the magnetic field applied to the magnetic working substance of the second magnetic field application unit is strengthened and weakened.

20. The magnetic field application device of claim 19, wherein
the magnetic field application unit, the permanent magnet, the yoke, the coil, the magnetic resistance portion and the control unit are configured to
increase the magnetic flux of the permanent magnet flowing through at least one of the second closed magnetic circuit and the third closed magnetic circuit when the current flows through the first coil in the direction in which the magnetic field applied to the magnetic working substance of the first magnetic field application unit is weakened, and increase the magnetic flux of the permanent magnet flowing through at least one of the first closed magnetic circuit and the third closed magnetic circuit when the current flows through the second coil in the direction in which the magnetic field applied to the magnetic working substance of the second magnetic field application unit is weakened.

21. The magnetic field application device of claim 19, wherein the control unit is further configured to control the current flowing through the first coil such that the current flows in the direction in which the magnetic field applied to the magnetic working substance of the first magnetic field application unit is strengthened by allowing the current flowing through the second coil to flow in the direction in which the magnetic field applied to the magnetic working substance of the second magnetic field application unit is strengthened, and control the current flowing through the first coil such that the current flows in the direction in which the magnetic field applied to the magnetic working substance of the first magnetic field application unit is weakened by allowing the current flowing through the second coil to flow in the direction in which the magnetic field applied to the magnetic working substance of the second magnetic field application unit is weakened.

22. The magnetic field application device of claim 19, wherein the control unit is further configured to control the current flowing through the first coil such that the current selectively flows in the directions in which the magnetic field applied to the magnetic working substance of the first magnetic field application unit is strengthened and weakened, and control the current flowing through the second coil such that the magnetic field applied to the magnetic working substance of the second magnetic field application unit is kept constant.

23. The magnetic field application device of claim 4, further comprising:

a control unit, the magnetic field application unit including a first magnetic field application unit and a second magnetic field application unit, the closed magnetic circuits including a first closed magnetic circuit provided with the first magnetic field application unit, a second closed magnetic circuit provided with the second magnetic field application unit, and a third closed magnetic circuit provided with the magnetic resistance portion and the coil, the magnetic field application unit, the permanent magnet, the yoke, the coil and the magnetic resistance portion being configured such that a magnetic flux of the permanent magnet is branched to flow through the first closed magnetic circuit, the second closed magnetic circuit, and the third closed magnetic circuit when the coil is non-energized, and the control unit being configured to control the current flowing through the coil such that the current selectively flows in the directions in which the magnetic field applied to the magnetic working substances of the first and second magnetic field application units is strengthened and weakened.

24. The magnetic field application device of claim 23, further comprising:

an auxiliary coil provided in the first closed magnetic circuit or the second closed magnetic circuit, the control unit being further configured to control the current flowing through the auxiliary coil such that intensities of the magnetic fields applied to the magnetic working substances of the first and second magnetic field application units approach each other.

25. The magnetic field application device of claim 1, wherein the closed magnetic circuits include a first closed magnetic circuit provided with the magnetic field application unit and the coil, and a second closed magnetic circuit provided with a magnetic resistance portion, and the magnetic field application unit, the permanent magnet, the yoke and the coil are configured to strengthen the magnetic field of the permanent magnet when the current flows through the coil in the direction in which the magnetic field applied to the magnetic working substance is strengthened.

26. The magnetic field application device of claim 6, wherein the magnetic field application unit includes a first magnetic field application unit and a second magnetic field application unit, the coil includes a first coil and a second coil, the closed magnetic circuits include a first closed magnetic circuit provided with the first magnetic field application unit and the first coil, a second closed magnetic circuit provided with the second magnetic field application unit and the second coil, and a third closed magnetic circuit provided with the magnetic resistance portion, the magnetic field application unit, the permanent magnet, the yoke, the coil and the control unit are configured such that a magnetic flux of the permanent magnet is branched to flow through the first closed magnetic circuit, the second closed magnetic circuit, and the third closed magnetic circuit when the first coil and the second coil are non-energized, and the control unit is further configured to control the current flowing through the first coil such that the current selectively flows in the directions in which the magnetic field applied to the magnetic working substance of the first magnetic field application unit is strengthened and weakened, and control the current flowing through the second coil such that the current selectively flows in the directions in which the magnetic field applied to the magnetic working substance of the second magnetic field application unit is strengthened and weakened.

27. The magnetic field application device of claim 26, wherein the magnetic field application unit, the permanent magnet, the yoke, the coil and the control unit are configured to increase the magnetic flux of the permanent magnet flowing through at least one of the second closed magnetic circuit and the third closed magnetic circuit when the current flows through the first coil in the direction in which the magnetic field applied to the magnetic working substance of the first magnetic field application unit is weakened, and increase the magnetic flux of the permanent magnet flowing through at least one of the first closed magnetic circuit and the third closed magnetic circuit when the current flows through the second coil in the direction in which the magnetic field applied to the magnetic working substance of the second magnetic field application unit is weakened.

28. The magnetic field application device of claim 26, wherein the control unit is further configured to control the current flowing through the first coil such that the current flows in the direction in which the magnetic field applied to the magnetic working substance of the first magnetic field application unit is strengthened by allowing the current flowing through the second coil to flow in the direction in which the magnetic field applied to the magnetic working substance of the second magnetic field application unit is strengthened, and control the current flowing through the first coil such that the current flows in the direction in which the magnetic field applied to the magnetic working substance of the first magnetic field application unit is weakened by allowing the current flowing through the second coil to flow in the direction in which the magnetic field applied to the magnetic working substance of the second magnetic field application unit is weakened.

29. The magnetic field application device of claim 26, wherein the control unit is further configured to control the current flowing through the first coil such that the current selectively flows in the directions in which the magnetic field applied to the magnetic working substance of the first magnetic field application unit is strengthened and weakened, and control the current flowing through the second coil such that the magnetic field applied to the magnetic working substance of the second magnetic field application unit is kept constant.

30. The magnetic field application device of claim 6, wherein the magnetic field application unit includes a first magnetic field application unit and a second magnetic field application unit, the closed magnetic circuits include
 a first closed magnetic circuit provided with the first magnetic field application unit,
 a second closed magnetic circuit provided with the second magnetic field application unit, and
 a third closed magnetic circuit provided with the magnetic resistance portion and the coil, the magnetic field application unit, the permanent magnet, the yoke, the coil and the control unit are configured such that a magnetic flux of the permanent magnet is branched to flow through the first closed magnetic circuit, the second closed magnetic circuit, and the third closed magnetic circuit when the coil is non-energized, and the control unit is further configured to control the current flowing through the coil such that the current selectively flows in the directions in which the magnetic field applied to the magnetic working substances of the first and second magnetic field application units is strengthened and weakened.

31. The magnetic field application device of claim 30, further comprising:

an auxiliary coil provided in the first closed magnetic circuit or the second closed magnetic circuit, the control unit being further configured to control the current flowing through the auxiliary coil such that intensities of the magnetic fields applied to the magnetic working substances of the first and second magnetic field application units approach each other.

* * * * *